United States Patent
Aull et al.

(10) Patent No.: US 7,822,983 B2
(45) Date of Patent: Oct. 26, 2010

(54) PHYSICAL DEVICE BONDING

(75) Inventors: Randall E. Aull, Kenmore, WA (US); Bernard J. Thompson, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 1000 days.

(21) Appl. No.: 10/645,008

(22) Filed: Aug. 21, 2003

(65) Prior Publication Data
US 2005/0044372 A1 Feb. 24, 2005

(51) Int. Cl.
*H04L 9/32* (2006.01)

(52) U.S. Cl. .................. 713/172; 713/176; 713/179; 380/270; 380/283; 709/232; 726/9; 726/14; 726/20; 455/41.2; 455/422.1

(58) Field of Classification Search .................. 713/176, 713/172
See application file for complete search history.

(56) References Cited

U.S. PATENT DOCUMENTS

| | | | |
|---|---|---|---|
| 4,161,766 A | 7/1979 | Castleberry et al. | |
| 5,265,252 A | 11/1993 | Rawson, III et al. | |
| 5,339,432 A | 8/1994 | Crick et al. | |
| 5,507,810 A | 4/1996 | Prewett et al. | |
| 5,607,476 A | 3/1997 | Prewett et al. | |
| 5,613,123 A | 3/1997 | Tsang et al. | |
| 5,713,959 A | 2/1998 | Bartlett et al. | |
| 5,727,212 A | 3/1998 | Dinallo | |
| 5,733,337 A | 3/1998 | Carr, Jr. et al. | |
| 5,796,827 A | 8/1998 | Coppersmith et al. | |
| 5,922,028 A | 7/1999 | Plouhar et al. | |
| 5,923,757 A * | 7/1999 | Hocker et al. | 345/156 |
| 5,964,807 A | 10/1999 | Gan et al. | |
| 5,980,504 A | 11/1999 | Sharkey et al. | |
| 5,999,996 A | 12/1999 | Dunn | |
| 6,007,570 A | 12/1999 | Sharkey et al. | |
| 6,009,247 A | 12/1999 | Canora et al. | |

(Continued)

FOREIGN PATENT DOCUMENTS

EP 869651 A 10/1998

(Continued)

OTHER PUBLICATIONS

Mark D. Corner, et al., Zero-Interaction Authentication, Proceedings of the 8th Annual International Conference on Mobile Computing and Networking, Sep. 23-28, 2002, pp. 1-11, Atlanta, Georgia.

(Continued)

*Primary Examiner*—Michael Pyzocha
*Assistant Examiner*—Shewaye Gelagay
(74) *Attorney, Agent, or Firm*—Wolf, Greenfield & Sacks, P.C.

(57) ABSTRACT

A system and/or method that facilitates the installation and/or authentication of a device by invoking installation protocols and/or authentication protocols for a non-physical connection. A physical interface component provides a physical connection between at least one wireless device and at least one network entity in which the installation protocols and/or authentication protocols can be exchanged. The physical interface component can utilize a token key to establish multiple non-physical connections with multiple wireless devices. Additionally, the physical interface component can utilize a daisy chain scheme to install and/or authenticate a wireless device.

24 Claims, 16 Drawing Sheets

U.S. PATENT DOCUMENTS

| | | | |
|---|---|---|---|
| 6,025,538 | A | 2/2000 | Yaccarino, III |
| 6,073,051 | A | 6/2000 | Sharkey et al. |
| 6,077,989 | A | 6/2000 | Kandel et al. |
| 6,080,194 | A | 6/2000 | Pachence et al. |
| 6,095,149 | A | 8/2000 | Sharkey et al. |
| 6,099,514 | A | 8/2000 | Sharkey et al. |
| 6,104,913 | A | 8/2000 | McAllister |
| 6,118,882 | A | 9/2000 | Haynes |
| 6,122,549 | A | 9/2000 | Sharkey et al. |
| 6,123,731 | A | 9/2000 | Boyce et al. |
| 6,126,682 | A | 10/2000 | Sharkey et al. |
| 6,140,452 | A | 10/2000 | Felt et al. |
| 6,211,799 | B1 | 4/2001 | Post et al. |
| 6,223,018 | B1 | 4/2001 | Fukumoto et al. |
| 6,378,005 | B1 | 4/2002 | Hyder et al. |
| 6,437,772 | B1 | 8/2002 | Zimmerman et al. |
| 6,567,915 | B1 | 5/2003 | Guthery |
| 6,609,199 | B1 | 8/2003 | DeTreville |
| 6,643,774 | B1 | 11/2003 | McGarvey |
| 6,678,516 | B2 | 1/2004 | Nordman et al. |
| 6,721,555 | B1 * | 4/2004 | Phillips et al. ............... 455/411 |
| 6,754,472 | B1 | 6/2004 | Williams et al. |
| 6,778,226 | B1 | 8/2004 | Eshelman et al. |
| 6,795,688 | B1 * | 9/2004 | Plasson et al. ............. 455/41.2 |
| 6,815,657 | B2 | 11/2004 | Toyoshima et al. |
| 6,864,780 | B2 | 3/2005 | Doi et al. |
| 7,174,130 | B2 * | 2/2007 | Kurisko et al. ............. 455/41.2 |
| 7,202,773 | B1 | 4/2007 | Oba et al. |
| 2001/0049263 | A1 | 12/2001 | Zhang |
| 2002/0023215 | A1 | 2/2002 | Wang et al. |
| 2003/0014186 | A1 | 1/2003 | Adams, Jr. et al. |
| 2003/0078072 | A1 * | 4/2003 | Serceki et al. ............. 455/557 |
| 2003/0172271 | A1 * | 9/2003 | Silvester .................... 713/170 |
| 2004/0122649 | A1 * | 6/2004 | Bartek et al. .................. 703/23 |
| 2005/0066044 | A1 * | 3/2005 | Chaskar et al. ............. 709/230 |
| 2005/0111420 | A1 | 5/2005 | Fujii |
| 2005/0120096 | A1 * | 6/2005 | Rekimoto et al. ........... 709/220 |
| 2005/0266798 | A1 | 12/2005 | Moloney et al. |
| 2006/0022048 | A1 | 2/2006 | Johnson |

FOREIGN PATENT DOCUMENTS

| | | |
|---|---|---|
| EP | 1233337 | 8/2002 |
| EP | 1233337 A | 8/2002 |
| JP | 2002271274 A | 9/2002 |

OTHER PUBLICATIONS

Refik Molva, et al., Authentication Method with Impersonal Token Cards, IEEE Computer Society Symposium on Research in Security and Privacy, 1993, pp. 1-10.

Vipin Samar, Unified Login with Pluggable Authentication Modules (PAM), Proceedings of the 3rd ACM Conference on Computer and Communications Security, 1996, pp. 1-10, New Delhi, India.

European Search Report dated Apr. 24, 2006, mailed Apr. 28, 2006 for European Patent Application Serial No. 05112925, 4 pages.

ISO/IEC 8802-11. "IEEE Standard for Information Technology-Telecommunications and Information Exchange Between Systems-Local and Metropolitan Area Networks-Specific Requirement. Part 11: Wireless LAN Medium Access Control (MAC) and Physical Layer (PHY) Specification"(1999) pp. 1, 34-58.

European Search Report dated Jun. 7, 2006, mailed Jul. 7, 2006 for European Patent Application No. 05112925, 9 pages.

ECMA publication (ECMA/TC32-TG19), Geneva, Oct. 2002; Near filed communication (NFC).

OA dated Aug. 25, 2008 for U.S. Appl. No. 11/159,605, 18 pages.

"Bioanalogics Technology Resources"; downloaded from http://www.bioanalogics.com/technology.htm on Jun. 19, 2003, 2 pages.

"Bioanalogics Technology—Body Composition Techniques"; downloaded from http://www.bioanalogics.com/techniques.htm on Jun. 19, 2003, 7 pages.

"Wireless connections made easy"; Specification of the Bluetooth System, specification vol. 1, Core, v.1.1, Feb. 22, 2001, pp. 1-32; and Revision History, Feb. 22, 2001, pp. 896-897.

"Personal Area Networks: Near-field intrabody communication"; IBM Systems Journal, vol. 35, No. 3&4, 1996—MIT Media Lab, 11 pages.

Martin Lutz, "The Determination of the Immunity to Electrostatic Discharge "ESD" with Transient 1000 Generator", Seminar 1999, EMC Partner.

* cited by examiner

PHYSICAL DEVICE BONDING

TECHNICAL FIELD

This invention relates generally to a wireless device and a network entity (e.g., a host computer). More particularly, this invention relates to the installation and/or authentication of a non-physical connection between a wireless device and a network entity.

BACKGROUND OF THE INVENTION

Computer products and other networking equipment have emerged as one of the largest and fastest growing industries. With the rapid improvements made within the industry, electronic manufacturers continuously strive to satisfy the on-going demand for products providing functionality without restrictions such as, for example, size, power consumption, compatibility, ergonomics, software capability, lifetime, range, productivity, usable-interface, security, speed, portability, . . . .

One restriction the electronic industries have vastly improved upon is providing a range or degree of freedom associated with employment of wireless networks and/or devices. Wireless networks and/or devices such as, but not limited to, wireless local area networks (WLAN), Bluetooth, local area network (LAN), sub-networks (e.g., wireless mouse and personal computer), PDA's, mice, keyboards, speakers, monitors, routers, access points, hubs, . . . facilitate functionality with mitigation of wires and accompanied restrictions. In addition to providing degree(s) of freedom, wireless devices and/or networks are advantageous to hard-wired networks and/or devices for numerous reasons. Wireless systems are pleasing to the eye since the clutter of unwanted hard-wires is eliminated. For example, plasma flat-screen televisions involve mounting on a wall similar to that of a painting mounted to a wall. By utilizing a wireless method and/or system, the wires for the television would not be seen hanging from the wall, and the result is a more pleasant looking, wall-mounted television. Furthermore, a hard-wire is a physical restriction by limiting the range of the device and/or network with the actual length of the wire. For example, a hard-wired Ethernet connection for a laptop can only be utilized within physical constraints of length of the Ethernet cable. Additionally, hard-wires have to be connected, which can involve matching an endless amount of plugs and connectors.

Not only are wireless networks and/or devices employed within the personal computer realm (e.g., wireless keyboards, mice, speakers, . . . ), but common households are increasing use of wireless home networks and/or devices. For example, broad-band connections are becoming more affordable for home users in which multiple personal computers anticipate connectivity. Dependant upon location of the personal computers, a network can be employed in order to distribute and utilize the broad-band connection. However, common problems of using hard-wires for the network can arise (e.g., cost, degree of freedom, eye-pleasing, . . . ). Thus, wireless networks and/or devices can be utilized in order to cure the foregoing problems.

Although benefits are apparent for wireless networks and/or devices, many problems arise involving installation of such products. With the increasing number of wireless networks, a difficulty arises to install a wireless device with a particular network entity (e.g., wireless mouse with a personal computer, wireless speakers with a receiver, wireless access point with a router, . . . ). Additionally, the network entity does not know when to install a wireless device and/or what wireless device to install. Moreover, a wireless device usually needs to be within range of the network entity in order to be detected and installed.

Another complex problem involving wireless networks and/or devices involves security and authentication. Although wireless networks and/or devices provide a vast amount of benefits, a hard-wire network and/or device is typically more secure based at least upon the physical connection assumed to be authenticated. On the contrary, wireless networks and/or devices are prone to "sniffing" (e.g., the act of eavesdropping on messages such as, but not limited to, confidential business data or passwords in transit) and other hack techniques (e.g., port scanning, transfer communication protocol (TCP) spoofing, user datagram protocol (UDP) spoofing, TCP session spoofing, . . . ) which are utilized in order to intrude and exploit the network security.

In view of the above, there is a need to improve upon and/or provide systems and/or methods for facilitating wireless device installation and/or authentication with a network entity to establish a non-physical connection.

SUMMARY OF THE INVENTION

The following presents a simplified summary of the invention in order to provide a basis understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

The subject invention provides for a physical device and host interface that facilitates device installation and authentication. As noted above, conventional host computer device installation and authentication schemes can be highly deficient as applied to wireless and/or remote devices. The subject invention provides a framework for installing and/or authenticating remote and wireless device(s) through a common physical interface.

One particular aspect of the invention provides for an physical interface (e.g., cord, cable, cradle, dock, connector, coupler, touch pad, biological interface, biological materials, wand, universal serial bus (USB), . . . ) that, when engaged, prompts a host computing system to search for and install the interface. It is to be appreciated that the host computing system need not search for the wireless device to install and/or authenticate but rather the physical connection can initiate the information transfer of what and where the wireless device is to be installed and/or authenticated. Another aspect of the invention provides for a security component that facilitates transmission of authentication information without requiring user interaction. By connecting device(s) to the host via the electrical interface, a user indicates to the host a desire to install the device(s). While the device(s) and host are connected, they can exchange security information securely without the risk of others accessing "sniffing," the data exchange over the air or network.

In addition, security information such as personal identification numbers (PINs) are not very secure when a user is required to enter PIN numbers etc. since they are limited by what a user is willing to type in or remember, and they are limited by the values that both sides (client and host) allow to be entered. In addition, the transfer of security information can be subject to line-of-sight breaches of security when the information is displayed on the display screen. The subject invention mitigates this undesirable security aspects of conventional schemes. By allowing the data exchange to occur via the electrical interface without user interaction, a more secure PIN can be generated. Once the information is exchanged, the device can be electrically disconnected, allowing it to communicate remotely through standard mechanism(s).

The present invention generally relates to a physical device bonding system between a wireless device and a network entity to establish a non-physical connection. In one aspect in accordance with the present invention, the physical device bonding system comprises a physical interface component to provide a physical connection and an invocation component to invoke installation and/or authentication of the wireless device physically connected to the network entity. The installation and/or authentication can be invoked either during physical connection or at a later time. The physical interface component can be, but not limited to, a cord, cradle, human, touch-pad, dock, wand, wire, conductive materials, . . . . By utilizing advantages of a physical connection (e.g., definitiveness of device to install and when to install, authentication and security, . . . ) to establish a non-physical connection, the complications of conventional installation and/or authentication techniques and/or systems for wireless devices between network entities can be mitigated.

The invocation component can utilize installation protocols and/or authentication protocols to facilitate the installation and/or authentication of a wireless device to a network entity. Upon physically connecting the wireless device and the network entity via the physical interface component, the installation of the wireless device for the non-physical connection is invoked via employment of the appropriate installation protocols. The installation protocols can be employed during the actual physical connection (e.g., synchronized) or delayed (e.g., reserved for a later time). Furthermore, the installation protocols can be transport specific (e.g., the non-physical connection transport—not the physical bonding interface transport). Additionally, the installation protocols can be propagated to the appropriate software for the specific transport in order to initiate device enumeration and bonding.

Moreover, the invocation component can utilize a security component which can employ authentication protocols to facilitate authentication between a wireless device and a network entity on a non-physical connection, which in turn, provides heightened security. By utilizing the physical connection, the physical interface can provide a secure connection to exchange authentication protocols (e.g., security information) such as, for example, a more secure unique personal identification number (PIN) through the physical connection between the wireless device and the network entity. The removal/mitigation of user interaction(s) facilitates such security.

The physical device bonding system can employ artificial intelligence techniques to facilitate the installation and/or authentication of the wireless device for a non-physical connection. Thus, the system can infer proper installation and/or authentication for a wireless device based upon, but not limited to, historical data.

To the accomplishment of the foregoing and related ends, the invention then, comprises the features hereinafter fully described and particularly pointed out in the claims. The following description and the annexed drawings set forth in detail certain illustrative aspects of the invention. These aspects are indicative, however, of but a few of the various ways in which the principles of the invention may be employed and the present invention is intended to include all such aspects and their equivalents. Other objects, advantages and novel features of the invention will become apparent from the following detailed description of the invention when considered in conjunction with the drawings.

DETAILED DESCRIPTION OF THE INVENTION

Figure 1:
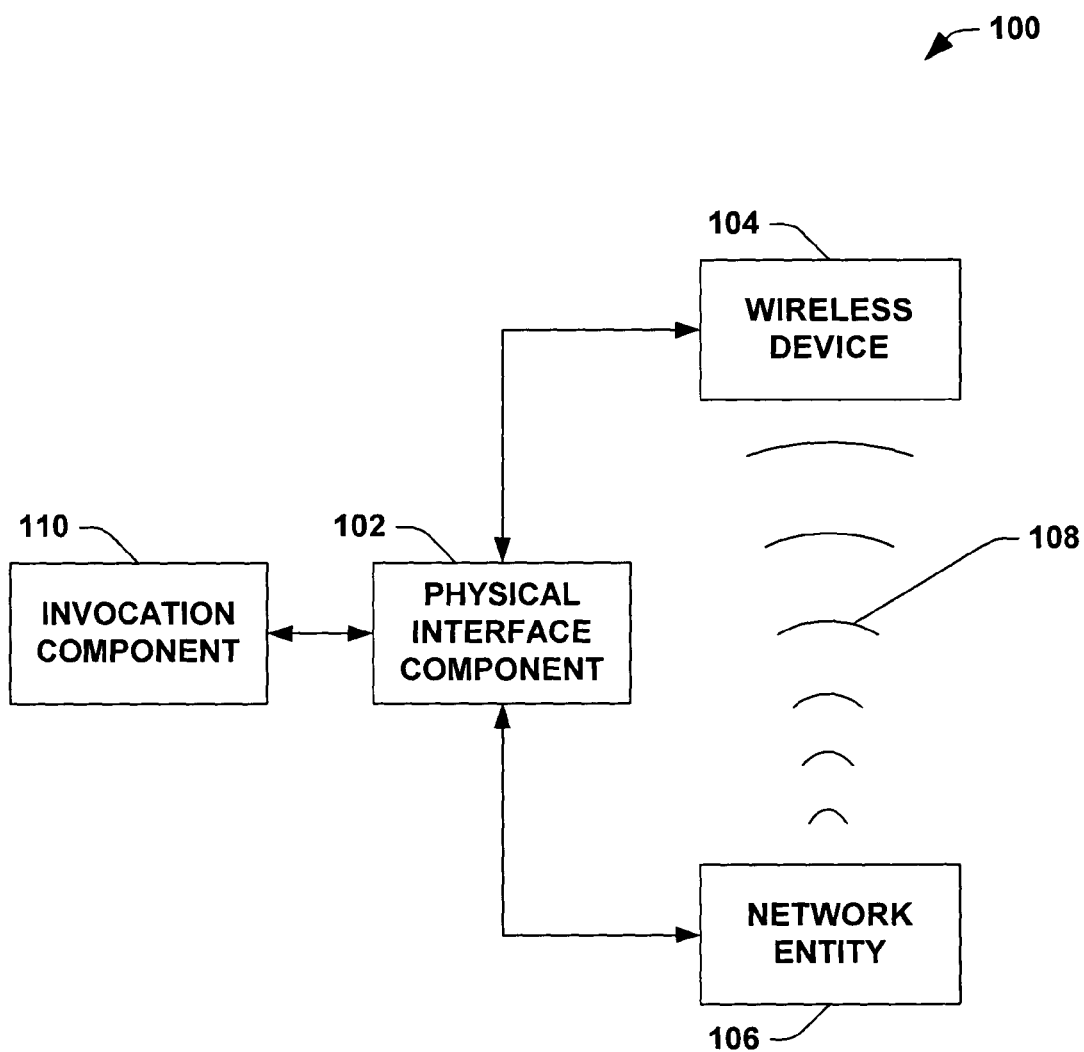
FIG. 1 is a block diagram of physical device bonding system in accordance with an aspect of the present invention.

The present invention is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

As used in this application, the terms "component" and "system" are intended to refer to a computer-related entity, either hardware, a combination of hardware and software, software, or software in execution. For example, a component may be, but is not limited to being, a process running on a processor, a processor, an object, an executable, a thread of execution, a program, and a computer. By way of illustration, both an application running on a server and the server can be a component. One or more components may reside within a process and/or thread of execution and a component may be localized on one computer and/or distributed between two or more computers.

Artificial intelligence based systems (e.g., explicitly and/or implicitly trained classifiers) can be employed in connection with performing inference and/or probabilistic determinations and/or statistical-based determinations as described herein. The present invention can employ various inference schemes and/or techniques in connection with the present invention. As used herein, the term "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification schemes and/or systems (e.g., support vector machines, neural networks, expert systems, Bayesian belief networks, fuzzy logic, data fusion engines . . . ) can be employed in connection with performing automatic and/or inferred action in connection with the subject invention.

Now referring to the figures, FIG. 1 illustrates a physical device bonding system 100 comprising a physical interface component 102 that facilitates installation and/or authentication of a wireless device 104 to a network entity 106 for a non-physical connection 108 by providing a physical connection in which an invocation component 110 can invoke installation protocol(s) and/or authentication protocol(s). The invocation component 110 can employ installation protocols and/or authentication protocols that are typically specific to the wireless device 104 and can be propagated to appropriate software for transport in order to initiate device enumeration and bonding (discussed further below in connection with FIG. 2). It is to be appreciated that the invocation component 110 can be incorporated into the wireless device 104 or incorporated into the physical interface component 102. In other words, the physical interface component 102 can contain the invocation component 110 or a wireless device 104 can be manufactured incorporating the invocation component 110. Moreover, the invocation component 110 can employ installation protocols and/or authentication protocols during or after the physical connection between the wireless device 104 and the network entity 106 (provided by the physical interface component 102). For example, the system 100 can be used to transfer the installation protocols and/or authentication protocols in synchronization with an physical connection provided by the physical interface component 102. In addition, the installation and/or authentication protocols can be reserved (e.g., stored for later use) with the network entity 106 and/or the wireless device 104, in which installation and/or authentication can be invoked at a later time (e.g., upon the disengagement of the physical connection).

The physical interface component 102 can be any interface or combination of interfaces providing a physical connection between a wireless device 104 and a network entity 106 such as, but not limited to a, cord, cradle, human, touch-pad, dock, wand, wire, conductive materials, universal serial bus (USB) port, biological materials, connectors, couplers, . . . . It is to be appreciated that the physical interface component 102 can contain various connectors in order to facilitate installation and/or authentication of the non-physical connection 108 (e.g., wireless connection). The physical interface component 102 provides assurance regarding, for example, when a device is being installed, what device is being installed, and what network entity the device is being installed. Thus, the physical interface component 102 prompts the network entity 106 (e.g., host computing system) to search and install the device. Furthermore, the physical interface component 102 provides heightened security for authentication by protecting the information exchange from, for example, "sniffing." In yet another aspect in accordance with the present invention, the physical interface component 102 utilizes an artificial intelligence component to infer the installation protocol(s) and/or authentication protocol(s) of a wireless device 104 to a network entity 106 for a non-physical connection 108.

For example, a cord can be a physical interface component in which the installation can be invoked by the invocation component for a wireless keyboard to a personal computer. During the physical connection provided by the cord and associated connectors, the invocation component can invoke installation and/or authentication for a wireless connection between the keyboard and the personal computer. With a physical connection, the personal computer is aware of the wireless keyboard being installed and that the wireless keyboard physically connected anticipates installation and/or authentication to the personal computer. In other words, the network entity and the wireless device are aware of the installation and/or authentication via the hard-wire connection and associated connectors.

By utilizing a physical interface component 102 for the installation and/or authentication of a wireless device 104 (e.g., speakers, headset, keyboard, mouse, monitor, access point, wireless card, PDA, MP3 player, . . . ) to a network entity 106 (e.g., stereo receiver, personal computer, WLAN, LAN, router, host to a wireless device, etc . . . ) the network is aware of what device and when a device is being installed and/or authenticated for the non-physical connection 108. Moreover, the security for authentication for the network entity 106 and non-physical connection 108 is increased with the use of the physical interface component 102 (e.g., temporary hard-wired connection).

For example, a wireless adapter can communicate with a wireless router to provide a broad-band connection via, for example, a digital subscriber line (DSL). The wireless adapter can be connected to the wireless router via the physical interface component 102 for a temporary physical (e.g., hardwired) connection. The temporary physical connection can provide installation protocols and/or authentication protocols necessary via the invocation component for the wireless adapter and the wireless router to utilize the wireless connection (e.g., non-physical connection 108). Upon the completion of the installation and/or authentication (e.g., transfer of the installation protocols and/or authentication protocols by utilizing the invocation component 110), the temporary physical interface component 102 can be disengaged from the wireless adapter and the wireless router. Once disengaged, the wireless adapter and the wireless router can utilize the wireless connection (e.g., non-physical connection 108). By utilizing the physical interface component 102, the wireless router is aware that the wireless adapter being installed; the wireless adapter is aware of the wireless router to be installed on; and the security of authentication and installation is heightened. It is to be appreciated that the installation and/or authentication of the wireless adapter to the wireless router can be synchronized with the actual physical connection or be reserved for a later time.

In one aspect in accordance with the present invention, the physical device bonding system 100 provides a invocation component 110 which can utilize a daisy chain scheme to connect to a trusted network entity 106 in order to facilitate the invoking of the installation protocols and/or authentication protocols of a wireless device 104 to a network entity 106. The daisy chain scheme is a hardware configuration where devices are connected in series in which signals can be received by each device. For example, device A can be connected to device B, device B can be connected to device C, and so forth. Devices A, B and C can receive the same signals and/or modify the signal accordingly.

In another aspect in accordance with the present invention, the physical device bonding system 100 comprises a physical interface component 102 which can employ a token key providing the installation and/or authentication of multiple wireless devices 104 to at least one network entity 106 for a non-physical connection 108. Multiple wireless devices 104 can be physically connected (e.g., one at a time, or concurrently) to the physical interface component 102 via the physical interface component with a token key which can provide the installation protocols and/or authentication protocols to the network entity 106. Once all wireless devices 104 have been physically connected to the token key, the necessary protocols can be set aside. After the wireless devices 104 have been physically connected to the physical interface component 102 via the token key, the physical interface component 102 can be physically connected to the network entity 106 in which the invocation component 110 can invoke the installation and/or authentication of multiple wireless devices 104 with the network entity for the non-physical connection 108 (e.g., wireless connection).

Figure 2:
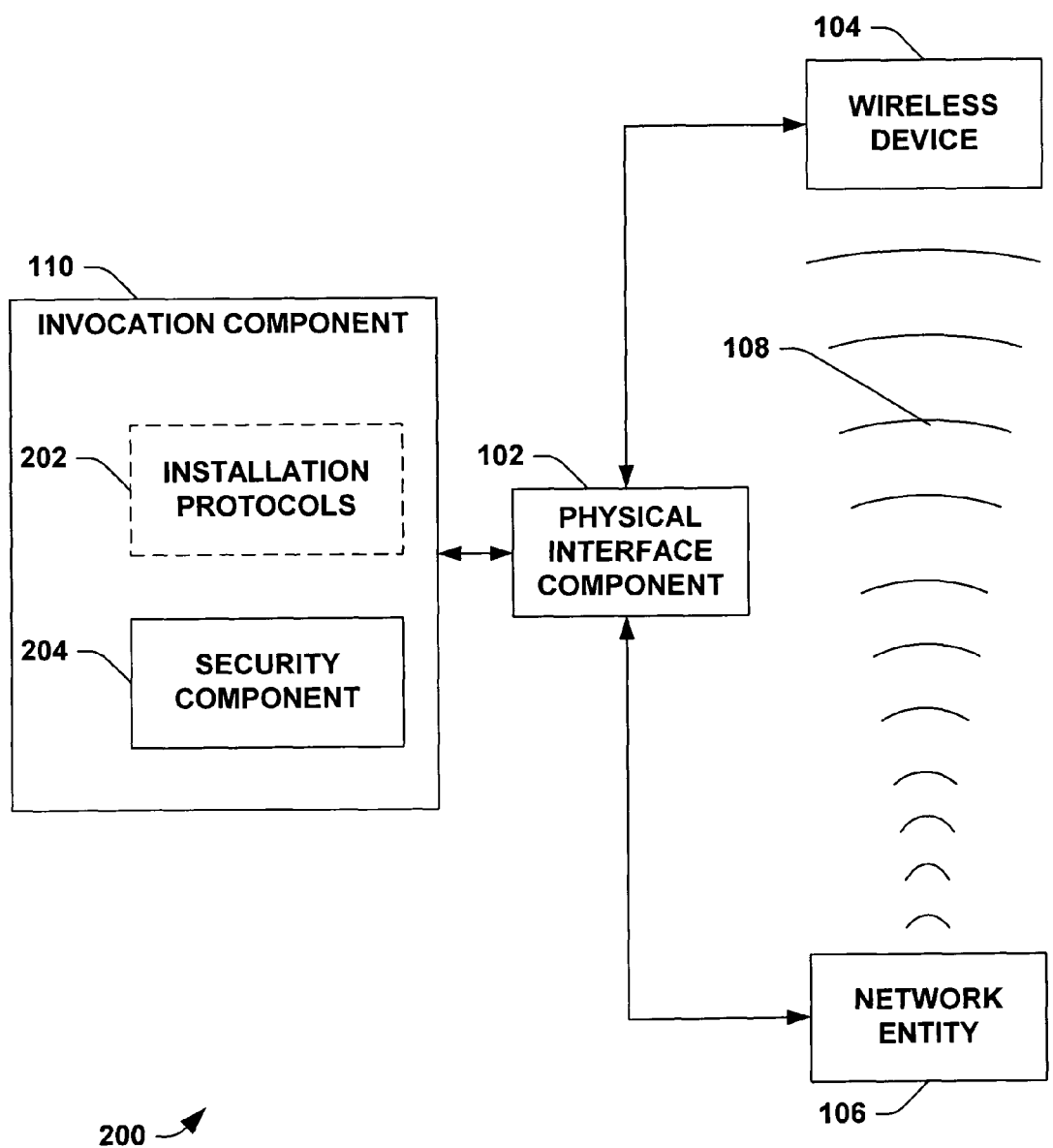
FIG. 2 is a block diagram of physical device bonding system in accordance with an aspect of the present invention.

Now turning to FIG. 2, a physical device bonding system 200 illustrates an invocation component 110 comprising installation protocols 202 and/or security component 204 to invoke the non-physical connection 108 between a wireless device 104 and a network entity 106 by use of a physical connection provided by a physical interface component 102. Upon physically connecting the wireless device 104 and the network entity 106 via the physical interface component 102, the installation of the wireless device 104 for the non-physical connection 108 is invoked by the invocation component 110 with the employment of installation protocols 202. In accordance with one aspect of the present invention, the installation protocols can be employed during the actual physical connection (e.g., synchronized) or delayed (e.g., reserved for a later time). Thus, the installation of the wireless device 104 to the network entity 106 for the non-physical connection 108 is not dependent upon time.

Furthermore, the installation protocols 202 can be transport specific (e.g., the non-physical connection transport— not the physical bonding interface transport). For example, a wireless device utilizing Bluetooth technology can employ a specific set of installation protocols 202 regarding the specific Bluetooth device. However, Internet protocol (IP) devices can have a different set of installation protocols 202 in which case the invocation component 110 employs a different set of installation protocols 202 specifically for the IP device. In other words, the installation protocols 202 can be specific and/or unique to the wireless device 104 which will be non-physically connected to the network entity 106. Thus, the installation of the wireless device 104 is facilitated by employing installation protocols 202 providing the network entity 106 with information which, at least provides connection between the wireless device and the network entity. Such information can be, but not limited to, the specific wireless device 104 to be installed, when the wireless device 104 is being installed, the network entity 106 to which the device is being installed, . . . . Moreover, the installation protocols 202 can be propagated to the appropriate software for the specific transport in order to initiate device enumeration and bonding.

For example, a wireless keyboard from brand A can be installed utilizing software B on a personal computer utilizing operating system C. When the brand A wireless keyboard is physically connected to the personal computer via the physical interface component 102, the installation for the wireless connection (e.g., the non-physical connection 108) can be invoked (by the invocation component 110) with the employment of the installation protocols 202. The installation protocols 202 can be specific regarding the type of non-physical connection (e.g., wireless, optical, inferred, . . . ). Moreover, the installation protocols 202 can be propagated to the appropriate software B for a personal computer utilizing operating system C for the wireless connection to initiate the brand A wireless keyboard enumeration and bonding. Thus, the disengagement of the physical interface component 102 provides the wireless device 104 and the network entity 106 to utilize the non-physical connection 108.

In addition, the invocation component 110 further comprises a security component 204 that utilizes authentication protocols to facilitate authentication between a wireless device 104 and a network entity 106 on a non-physical connection 108 which provides heightened security. While the wireless device 104 is physically connected to the network entity 106, information (e.g., authentication protocols and/or installation protocols) can be exchanged more securely without being vulnerable to hack techniques such as, for example, "sniffing" the information exchange over the air or network. When a hacker attempts to "sniff," he or she attempts to intercept messages containing information such as, but not limited to, security pins, passwords, credit card account numbers, personal information, . . . . However, with a physical connection between the wireless device 104 and the network entity 106, the hacker is unable to "sniff" any information exchange unless they too are physically connected with the wireless device 104 and the network entity 106. In other words, a connection can only be "sniffed" by a hacker attempting to steal information if the connection is a wireless and/or other open-ended connection (e.g., open the Internet without any security measures, and non-physical connections).

Moreover, the physical connection via the physical interface component 102 between the wireless device 104 and the network entity 106 can provide a secure connection utilizing the security component 204 that employs the exchange of authentication protocols (e.g., security information) such as, for example, a more secure unique personal identification number (PIN). In conventional authentication systems in which a wireless device 102 is authenticated with a network entity 106, security information such as, for example, PINs, is not secure upon entry of the identification number because they are limited to what the user types in and/or can remember. Additionally, the user is limited by the character values that each side (e.g., the wireless device side and the network entity side) is willing to accept for the PIN. By utilizing the physical interface component to provide a physical connection between the wireless device 104 and the network entity 106, the invocation component 110 can utilize the security component 204 to facilitate the transmission of information (e.g., authentication protocols and/or installation protocols)

without user interaction, providing the generation of a more secure and unique PIN. After authentication and/or other security information is communicated, the physical connection can be disengaged and the non-physical connection 108 can be employed between the wireless device 104 and the network entity 106.

For example, establishing a home network between a wireless adapter and a wireless router requires authentication in order to prevent unauthorized users connecting to the wireless router. Without such authentication, any user can connect to the wireless router provided the user has a wireless adapter and a computer. The present invention provides a physical connection via the physical interface component 102 in which the transfer of authentication and other security information is more secure in comparison to a non-physical connection (e.g., wireless, optical, . . . ). Once the wireless adapter is physically connected to the wireless router, the invocation component provides the home network of when the wireless adapter is being installed (e.g., upon completion of physical connection) and the type (e.g., brand, make, model, . . . ) of the wireless adapter. Furthermore, the authentication of the wireless adapter with the wireless router can be established utilizing the security component during the secure physical connection (e.g., hard-wire via the physical interface component). By employing the authentication protocols via the security component, the authentication is secure and the user need not remember or type in a secure PIN. Thus, the present invention provides the transmission of installation and/or authentication information without user interaction. Once the information (e.g., authentication protocols and/or installation protocols) exchange is complete by utilizing the invocation component, the physical interface component can be disengaged from the wireless adapter and the wireless router in order to utilize the wireless connection with the confidence of security.

Figure 3:
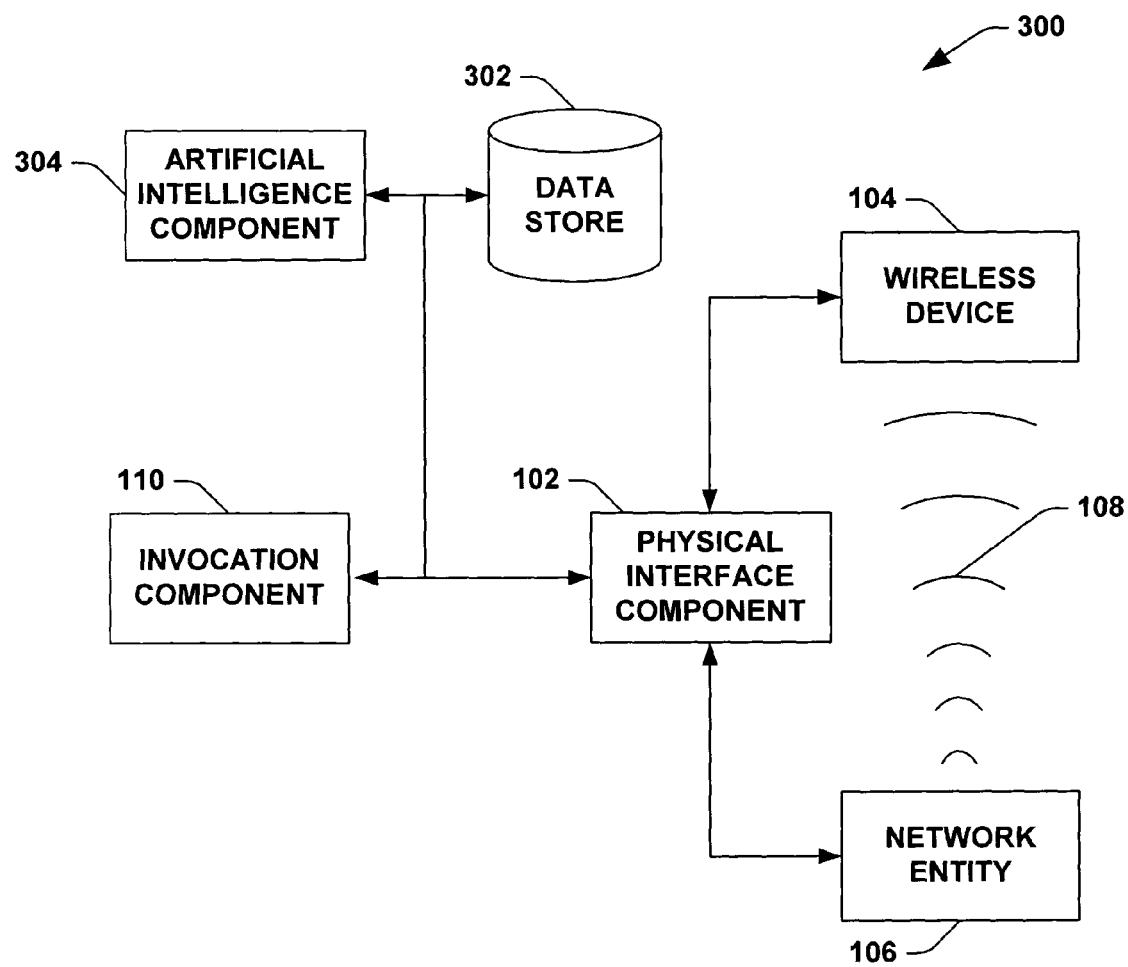
FIG. 3 is a block diagram of physical device bonding system utilizing an artificial intelligence component and data store in accordance with an aspect of the present invention.

Referring to FIG. 3, a physical device bonding system 300 illustrates a physical interface component 102 and an invocation component 110 utilizing a data store 302 and an artificial intelligence component 304 to facilitate the installation and/or authentication of a wireless device 104 to a network entity 106 for a non-physical connection 108. The artificial intelligence component 304 provides the mitigation of installation and/or authentication complications involved with establishing a non-physical connection 108. In accordance with one aspect of the present invention, the system 300 can utilize user profiles in order to infer any necessary information regarding the installation and/or authentication of a wireless device 104 to a network entity 106. Thus, the artificial intelligence component can infer the necessary installation protocols and/or authentication protocols for a specific wireless device 104 based at least upon a user profile containing physical device bonding information such as, for example, historic information (e.g., installed wireless devices, network entities utilized, operating systems installed on network entities, authentication information, PINs, . . . ).

For example, after a user profile is created, the history of the installation and authentication of such wireless devices can facilitate future installations and authentications of wireless devices while utilizing the present invention. Thus, after installing and authenticating a wireless mouse to a computer A utilizing the physical device bonding system 300, the installation and authentication information used can be used to facilitate the installation and authentication of a wireless keyboard to the computer A. The installation and/or authentication protocols used to install the first wireless device (e.g., the wireless mouse) can facilitate the installation of the second wireless device (e.g., the wireless keyboard) to the computer. For example, the artificial intelligence component 304 can utilize information associated with computer A such as, processor speed, RAM, hard drive space, type of processor, operating system, video card, Internet connection, location of device software, installation settings, authentication PINs, . . . . to facilitate the installation and/or authentication of additional wireless devices 104 on the network entity 106.

The data store 302 facilitates storage of user profiles (e.g., system profiles, network profiles, etc.) containing information such as, but not limited to, historic information (e.g., installed wireless devices, network entities utilized, operating systems installed on network entities, authentication information, PINs, . . . ). For example, the data store 302 can be computer readable media including, but not limited to, an ASIC (application specific integrated circuit), CD (compact disc), DVD (digital video disk), ROM (read only memory), floppy disk, hard disk, EEPROM (electrically erasable programmable read only memory) and memory stick in accordance with the present invention.

In another aspect in accordance with the present invention, the artificial intelligence component 304 can utilize artificial intelligence techniques (e.g., Bayesian learning methods that perform analysis over alternative dependent structures and apply a score, Bayesian classifiers and other statistical classifiers, including decision tree learning methods, support vector machines, linear and non-linear regression and/or neural network representation) to infer the appropriate software for enumeration and bonding of the wireless device 104 to the network entity 106. For example, a wireless adapter in a home network can be installed and authenticated with a wireless router. Utilizing the physical device bonding system 300, the artificial intelligence component 304 can infer the appropriate software for enumeration and bonding based upon, for example, wireless device installation history, type of wireless device, network entity involved, . . . . Thus, the system 300 can determine the appropriate software for the wireless adapter to install and/or authenticate the non-physical connection 108 with the network entity 106.

In yet another aspect in accordance with the present invention, the physical device bonding system 300 provides optimum performance levels based at least upon the model and/or type of wireless devices 104 and/or network entities 106. For example, wireless speakers can be physically connected via the physical interface component 102 utilizing the invocation component to invoke the installation and/or authentication to a music source (e.g., receiver, MP3 player, computer, compact disc player, . . . ). The physical device bonding system 300 can adjust the wireless speakers and/or the music source in order to provide the optimum performance. For example, the adjustments to the wireless speakers and/or music source can be, for example, fade (e.g., front and/or rear levels), balance (e.g., left and/or right channels), volume for each speaker, band graphic equalizer levels, bass, treble, . . . . In another aspect in accordance with the present invention, the adjustment of the speakers and/or music source can be based at least upon the position of the wireless speakers. In other words, the various adjustments for the wireless speakers and/or the music source can be adjusted based upon the distance and/or location of the speakers with respect to each other.

Figure 4:
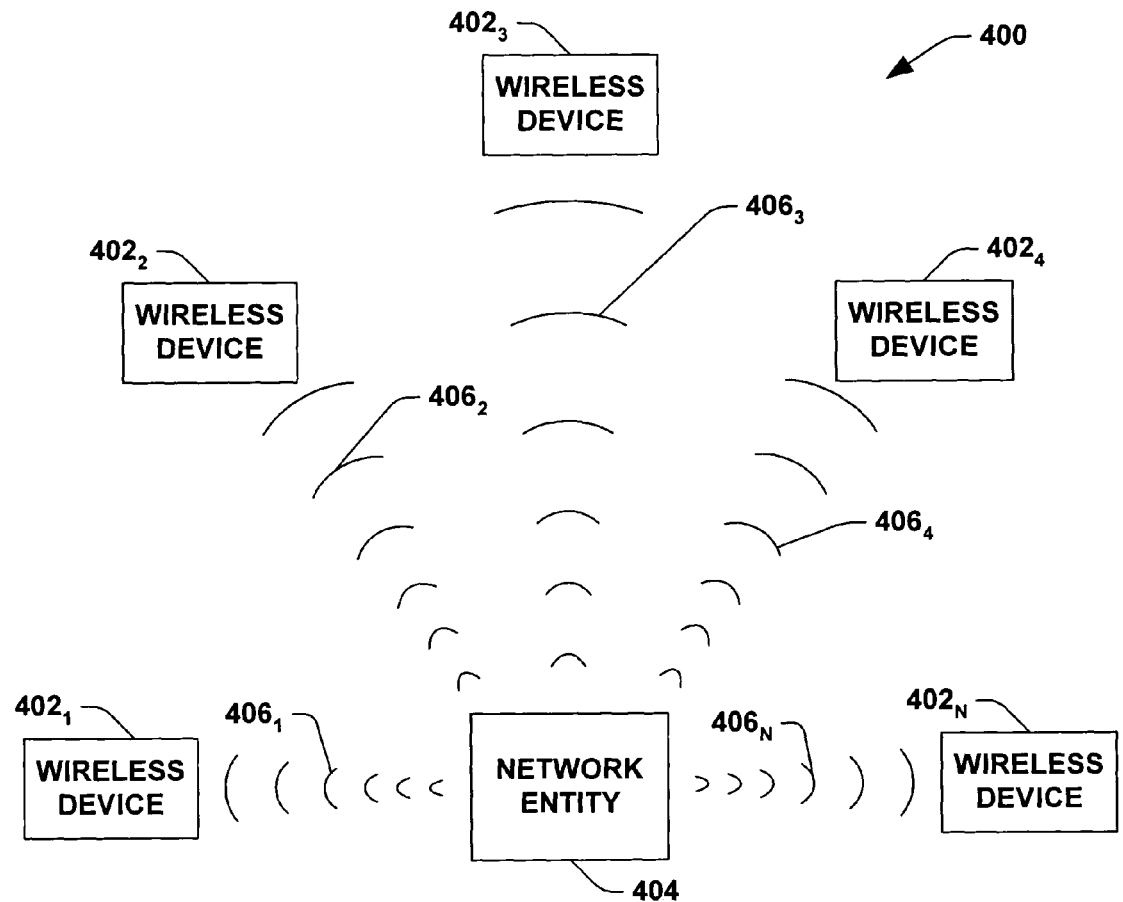
FIG. 4 is a block diagram of a conventional wireless network and wireless devices known in the prior art.

FIG. 4 illustrates a conventional prior art wireless configuration 400 comprising of a plurality of wireless devices $402_1$, $402_2, 402_3, 402_4$, and $402_N$ (collectively referred to as the wireless devices 402) which are connected wirelessly to a network entity 404 to mitigate the use of wires. It is to be appreciated the number of wireless devices connected to a network entity can be 1 to N, where N is an integer. Conventionally, a user would install each wireless device 402 individually finding a network entity 404 to connect in order to establish a non-physical connection $406_1$, $406_2$, $406_3$, $406_4$, and $406_N$ (collectively the non-physical connections 406, in which each non-physical connection relates to a wireless device and where N is an integer). Once the user selects the intended network entity 404 for installation, authentication of the non-physical connection 406 for the wireless device 402 and the network entity 404 can be invoked. Thus, installation is initiated with the wireless device 402 detecting a network entity 404 that is in range of the non-physical connection 406. The conventional installation and/or authentication procedure/system is extremely problematic. First, a network entity 404 is not aware of new wireless devices 402 being installed or when to look for new devices to install. Also, a wireless device 402 does not know which network entity 404 to establish a non-physical connection 406. Second, if the network entity 404 finds wireless devices 402, determination of which wireless devices 402 to install is not known. Third, a wireless device 402 must be within range of the non-physical connection 406 for installation and/or authentication. Lastly, authentication and security issues arise with the use of a non-physical connection 406 such as, but not limited to, PIN limitations, "sniffing," password limitations, . . . .

For example, a typical security measure invoked is the use of PINs which regulate wireless adapters that are authenticated to connect to the wireless router. In the present example, a user can provide a universal PIN which provides the wireless adapter to connect to the wireless router. However, the PIN is limited by what the user can remember and the character values that are compatible to each side (e.g., the wireless device side and the network entity side). For example, some PIN limitations can be requirements on the length, containing numbers, being different than user name, not incorporating user name, certain characters (e.g., *,_, . . . ), capital and lower case letters, . . . . Moreover, the PIN is vulnerable to "sniffing" from hackers who attempt to steal PINs to connect to the wireless router.

In another example involving conventional installation and/or authentication procedures/systems, universal interfaces (UIs) are provided on the network entity 404 and/or the wireless device 402. However, wireless keyboard installation and/or authentication to a computer (e.g., network entity) with a UI can be problematic. By utilizing a UI, a user needs to navigate within the interface in order to install the wireless keyboard. Yet, navigation through a UI can be troublesome without the aid of a keyboard. Since the user is installing a keyboard, one can not be used to navigate through the UI. Additionally, the simultaneous installation of multiple wireless devices 402 can cause immense confusion and complications for the network entity 404.

As discussed earlier, the present invention mitigates the complications that arise with conventional installation and/or authentication systems and methods. By utilizing a physical device bonding system, the physical connection between the wireless device and the network entity via the physical interface component can provide a secure information exchange that can provide installation and/or authentication protocols to facilitate establishment of the non-physical connection.

Figure 5:
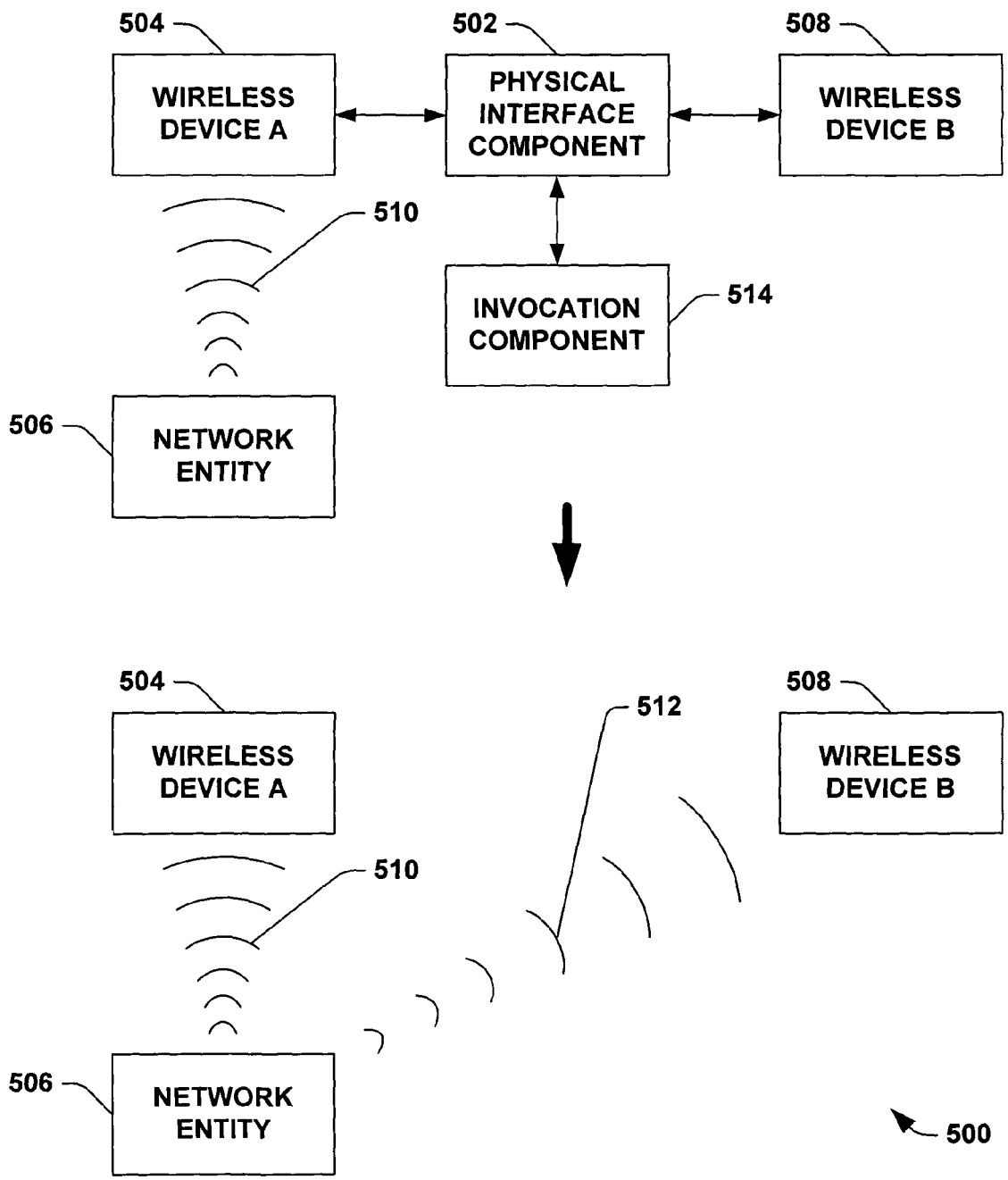
FIG. 5 is a block diagram of physical device bonding system employing a daisy chain scheme in accordance with an aspect of the present invention.

Now turning to FIG. 5, a physical device bonding system 500 illustrates a physical interface component 502 and a invocation component 514 utilizing an established secure and trusted non-physical connection 510 between a wireless device A 504 and a network entity 506 by employing a daisy chain scheme for the physical connection. In general, once a wireless device has been connected to a network entity via a physical interface component 502 in which the invocation component 514 establishes a non-physical connection with installation protocols and/or authentication protocols, the non-physical connection can be considered trusted and secure (e.g., utilizing the present invention heightens authentication and confidence of installation). A user can employ the daisy chain scheme (e.g., a hardware configuration in which devices are connected in series in which signals can be received by each device) utilizing a previously established secure and trusted non-physical connection 510 between the wireless device A 504 and the network entity 506. The user can physically connect a wireless device B 508 to the wireless device A 504 with the physical interface component 502 in order to establish a new trusted non-physical connection 512 (Note: the wireless device B 508 is not considered part of the secure non-physical connection 510 but can establish a separate and new secure and trusted non-physical connection 512 when the wireless device B 508 is installed and/or authenticated utilizing the present invention). It is to be appreciated that the invocation component 514 can be incorporated into the wireless device 508 or incorporated into the physical interface component 502 (as shown).

Upon the physical connecting of the wireless device B 508 to the wireless device A 504, the invocation component can invoke installation and/or authentication by employing installation protocols and/or authentication protocols. In accordance with one aspect of the present invention, the installation protocols can be employed during the actual physical connection (e.g., synchronized) or delayed (e.g., reserved for a later time). Thus, the installation of the wireless device B 508 to the network entity 506 for the new secure and trusted non-physical connection 512 is not dependent upon time. However, utilizing the system 500, the installation protocols and/or authentication protocols can be exchanged between the wireless device B and the wireless device A (which is on the secure and trusted non-physical connection 510). In other words, the necessary installation and/or authentication information can be transferred from the wireless device B 508 to the wireless device A 504 (e.g., via the physical interface component 502) and then from the wireless device A 504 to the network entity 506 (e.g., via the trusted non-physical connection 510). It is to be appreciated that the information exchange can occur between a plurality of wireless devices so long as each wireless device is part of a trusted non-physical connection. Once the installation protocols and/or authentication protocols are utilized, a new secure and trusted non-physical connection 512 can be established. Thus, the daisy chain scheme utilized in the system 500 facilitates the physical bonding of devices in which a wireless device B 508 can be installed and/or authenticated (e.g., with a physical interface component 502 and invocation component 514) through a wireless device A 504 connected to a network entity 506 with a secure and trusted non-physical connection 510.

For example, a computer can be a network entity for a plurality of wireless devices such as, but not limited to, wireless mouse, wireless keyboard, wireless monitor, wireless adapter, wireless speakers, wireless headset, wireless microphone, . . . . By utilizing the system 500, a user can employ the daisy chain scheme to install the plurality of wireless devices. Once the physical interface component is used to connect one wireless device, a trusted wireless connection is established. After a trusted wireless connection is established, future wireless devices can utilize the secure and trusted wireless connection through the previously installed wireless device. Thus, after a wireless mouse is installed and/or authenticated, the wireless keyboard can be physically connected to the mouse (via the physical interface component) in which the invocation component (incorporated on the wireless device or incorporated into the physical interface component) can invoke the installation and/or authentication of the wireless keyboard utilizing the appropriate protocols. After the appropriate installation and/or authentication is complete, the computer can have two wireless devices connected and two trusted wireless connections.

Figure 6:
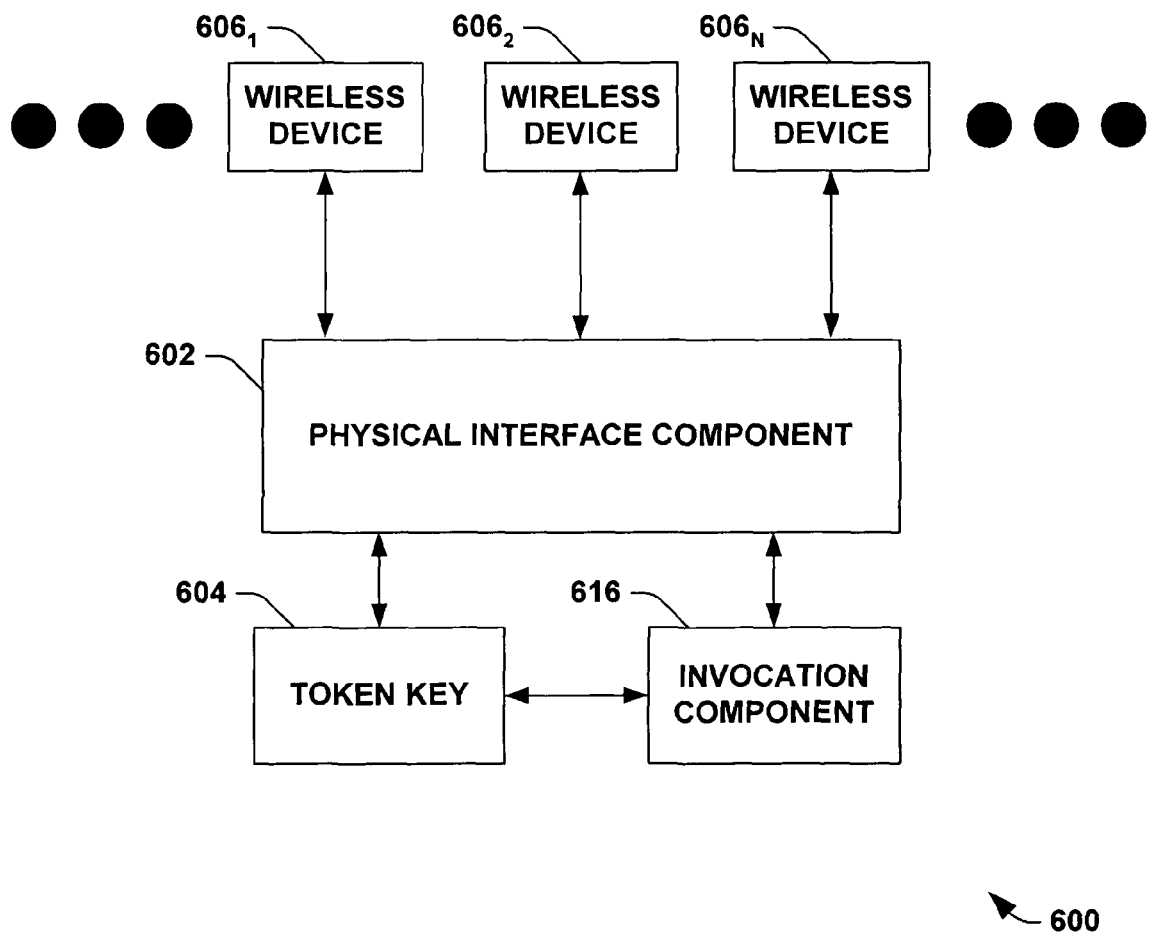
FIG. 6 is a block diagram of physical device bonding system employing a token key technique in accordance with an aspect of the present invention.
Figure 7:
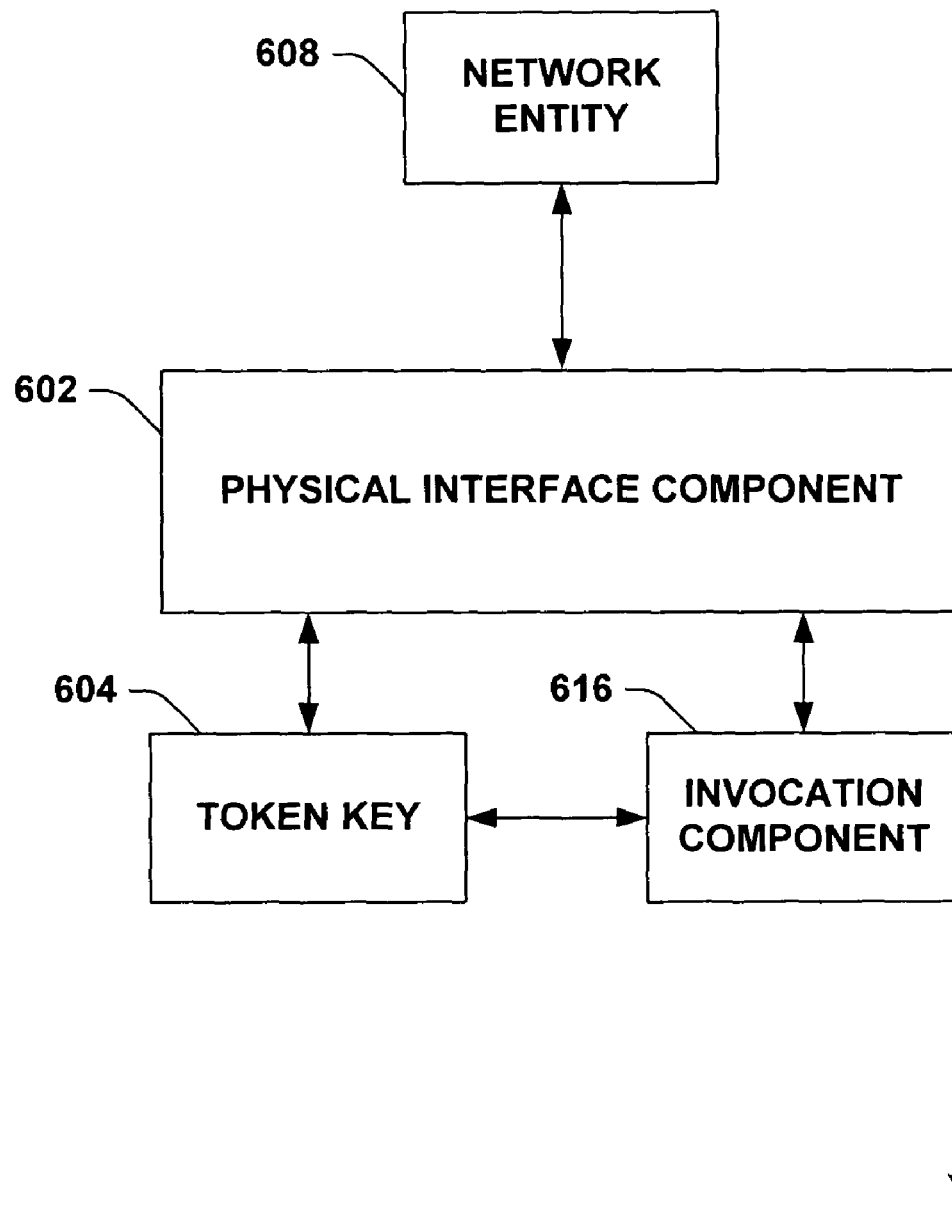
FIG. 7 is a block diagram of physical device bonding system employing a token key technique in accordance with an aspect of the present invention.
Figure 8:
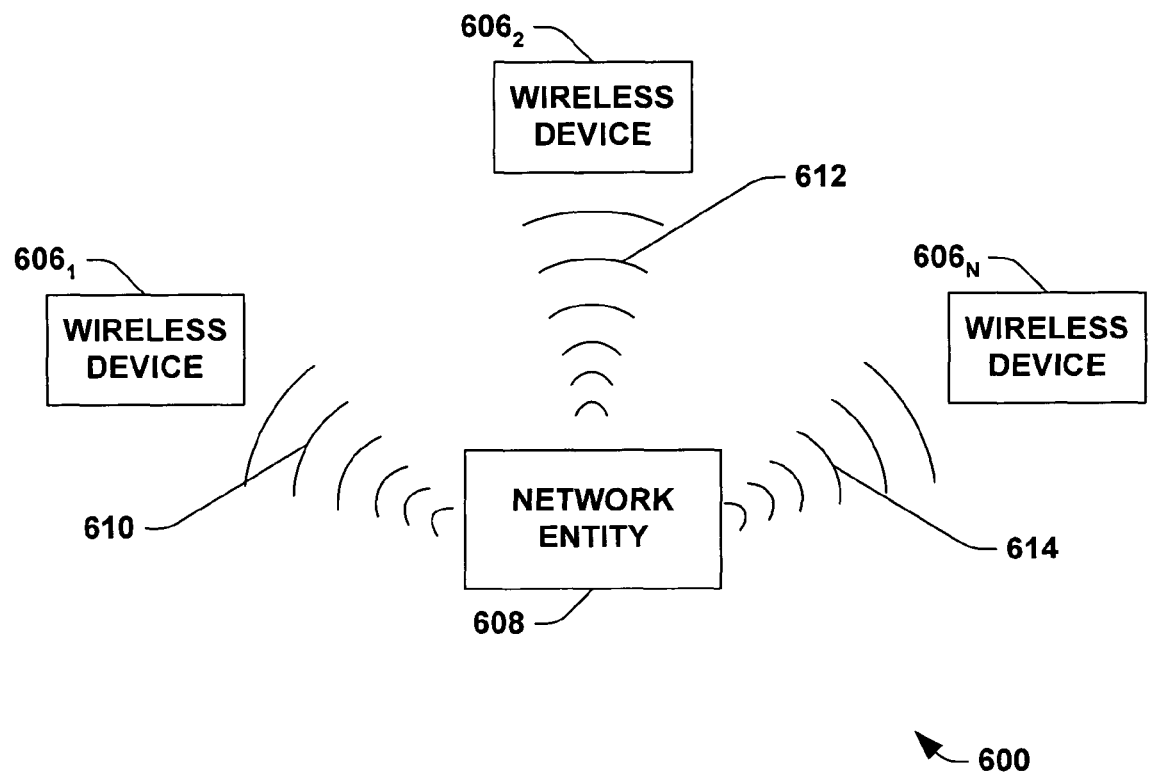
FIG. 8 is a block diagram of physical device bonding system employing a token key technique in accordance with an aspect of the present invention.

FIGS. 6-8 illustrate a physical device bonding system 600 employing the use of a token key 604 to facilitate the installation of more than one wireless device $606_1$ to a network entity 608 to establish a non-physical connection by the invocation component 616 employing installation and/or authentication protocols. Referring first to FIG. 6, a wireless device $606_1$ is physically connected to a physical interface component 602. A plurality of wireless devices $606_1$, $606_2$, $606_N$ (collectively referred to as wireless devices 606) can be employed with the use of a token key 604. It is to be appreciated the number of wireless devices can be from 1 to N, where N is an integer. The physical interface component 602 can employ a token key 604 which enables a user to physically connect a plurality of wireless devices $606_1$, $606_2$, and $606_N$ simultaneously or individually to establish a non-physical connection 610, 612 or 614 (shown in FIG. 8) respectively to at least one network entity 608. The wireless devices 606 are physically connected to the physical interface component 602 during which the installation and/or authentication protocols are reserved (e.g., stored for a later use). Once the wireless devices 606 have been physically connected to the physical interface component 602 containing the token key 604, the physical interface component 602 can be physically connected to the network entity 608 as depicted in FIG. 7. The necessary installation and/or authentication protocols that were reserved during the physical connection between the wireless devices 606 and physical interface component 602 can be utilized by the invocation component 616 to provide a non-physical connection 610, 612, 614 for each wireless device 606. After the information exchange of the physical interface component 602, the wireless devices $606_1$, $606_2$, $606_N$ establish non-physical connections 610, 612, 614 respectively with the network entity 608 as illustrated in FIG. 8. In other words, the physical interface component 602 provides the physical connection (e.g., physical contact via, for example, USB port, touch pad, cradle, . . . ) in which the token key reserves installation protocols and/or authentication protocols. Upon completion of physically connecting the wireless devices 606 via the physical interface component 602, the user can physically connect to the network entity 608, in which the invocation component 616 utilizes the physical connection to invoke the installation and/or authentication by employing the necessary protocols. It is to be appreciated the token key 604, and invocation component 616 can be incorporated into the physical interface component 602 and/or incorporated into the wireless device 606.

In one aspect in accordance with the present invention, the physical device bonding system 600 can be employed to establish a plurality of non-physical connections between wireless devices and a computer. For example, the physical interface component 602 containing a token key 604 can be physically connected to each wireless device a user wants to install and/or authenticate. The wireless devices 606 can be physically connected to the network entity 608 via the physical interface component 602 in which the invocation component 616 can exchange information such as, but not limited to, installation and/or authentication protocols. The information exchange necessary for each individual wireless device 606 can be reserved or stored during each individual physical connection. In other words, the first wireless device $606_1$, can exchange installation and/or authentication protocols during the same time as a second wireless device $606_2$ or the second wireless device $606_2$ can exchange protocols after the first wireless device $606_1$ has reserved the necessary information. Thus, the information exchange in which the protocols are reserved during the physical connection can occur simultaneously for each wireless device or individually.

In another aspect in accordance with the present invention, the physical interface component 602 containing a token key 604 can be a wand. For example, the wand can contain the token key which facilitates the installation and/or authentication of at least one wireless device. The wand can be physically touched (e.g., connected) to a wireless device that a user intends to install and/or authenticate. For example, the wireless device can utilize a touchpad to designate an area for information exchange between the wand and the wireless device. During the physical connection of the wireless device and the wand, the physical interface component and the token key can utilize the necessary information exchange containing, but not limited to, installation and/or authentication protocols. The wand can be physically touched to a plurality of wireless devices a user intends to install and/or authenticate. After the user has physically touched (e.g., connected) the wireless devices for installation and/or authentication, the wand can be physically touched to a network entity such as, for example, a computer. Upon the wand physically connecting to the network entity, the invocation component 616 can invoke installation and/or authentication by employing installation and/or authentication protocols for the non-physical connection between the wireless device and the network entity.

In another aspect in accordance with the present invention, a physical interface component containing a token key can utilize the daisy chain scheme. For example, the physical interface component containing the token key can be a wand, as discussed above. Once the wand is physically touched (e.g., connected) to at least one wireless device, the information exchange can occur in which the invocation component 616 can invoke installation and/or authentication. After the installation and/or authentication information is reserved during the physical connection, the wand can be physically touched (e.g., connected) to a wireless device which has a trusted non-physical connection with a network entity. For example, the wand can be physically touched to a tablet pc monitor (e.g., the wireless monitor connected to the computer is a trusted network since it was installed and/or authenticated by utilizing the present invention) employing an icon as a touchpad for the installation of wireless devices. Thus, the user would physically touch the wand to a wireless device and then to the monitor icon to install and/or authenticate the wireless device for the non-physical connection.

Figure 9:
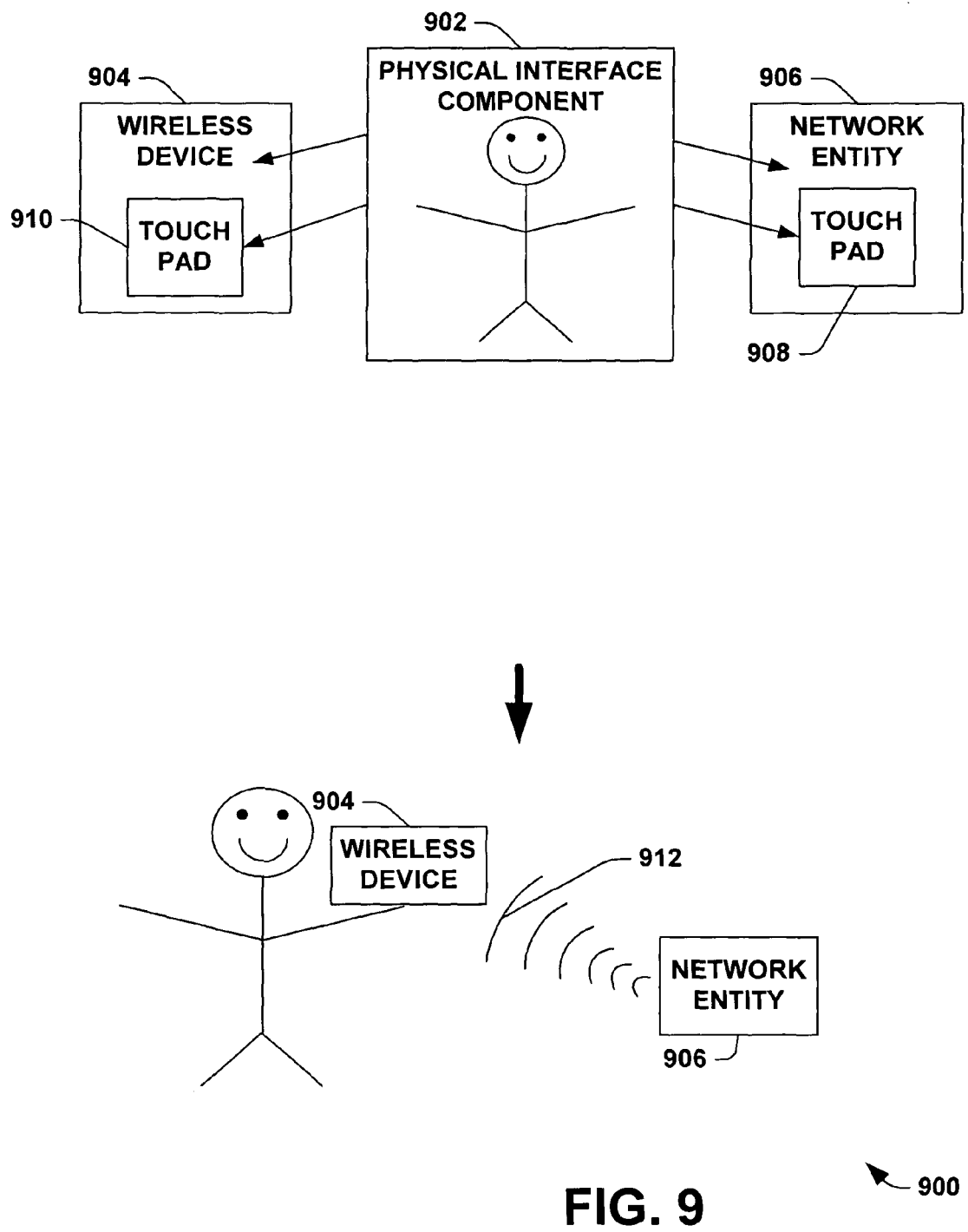
FIG. 9 is a block diagram of physical device bonding system utilizing a biological interface in accordance with an aspect of the present invention.

Referring to FIG. 9, a physical device bonding system 900 illustrates a physical connection between a wireless device 904 and a network entity 906 in accordance with an aspect of the present invention. A physical interface component 902 is provided by a direct human touch when it is applied to a designated area such as a touch pad 908, 910 and/or applied to another area of the wireless device 904 or network entity 906 such as the case material of the wireless device 904 and/or network entity 906. When the physical connection is achieved, electrical current begins to flow which can then be sensed by the respective devices (e.g., impedance detector, or other sensor) in which the invocation component (not shown) can initiate further automated procedures (e.g., invoking installation and/or authentication protocols) such as establishing a non-physical connection 912 (e.g., wireless network connections or transmitting configuration information between devices). The invocation component can be incorporated into the wireless device 904 and/or the network entity 906 in order to provide the initiation of installation and/or authentication. For example, the touch pad 910 within the wireless device 904 can contain the invocation component to facilitate installation and/or authentication.

The touch pads 908, 910 can be located or associated with substantially any area on a wireless device 904 or network entity 906 accessible to a user or users. These can include conductive or semi-conductive media capable of facilitating current flow between devices and through the human body. For example, such materials include copper, gold, silver, conductive plastics, metal, . . . . The case material of the wireless device 904 and/or network entity 906 is generally associated with the housing of the device and can include similar materials as the touch pads 908 and 910. This can include conductive coatings, laminates, plastics having conductive properties, and/or other materials that facilitate establishing an electrical circuit in accordance with biological contact with a wireless device. In some cases, touch pads 908, 910 can be provided in addition to having respective case materials that are also adapted to facilitate electrical activity. As can be appreciated, the touch pads 908, 910 and case materials can include various sizes, shapes, dimensions (e.g., cubic structure), textures, colors or other appearances (e.g., text indicating touch pad area). Once the human touch upon the case material and/or the touch pads 908 and 910 has provided the necessary physical connection in order to exchange the installation and/or authentication protocols, the non-physical connection 912 can be utilized for the wireless device 904 and the network entity 906.

For example, the installation of a wireless headset can be facilitated by utilizing a biological interface as the physical connection to provide the installation protocols. The wireless headset can employ at least one touch pad located, for example, on the ear piece. The physical connection necessary in order to exchange the installation protocols can be implemented by the user wearing the headset and touching a computer. Thus, the physical connection exchanging the installation protocols can be the user touching the headset via the touch pad on the ear piece and the user touching the computer.

Figure 10:
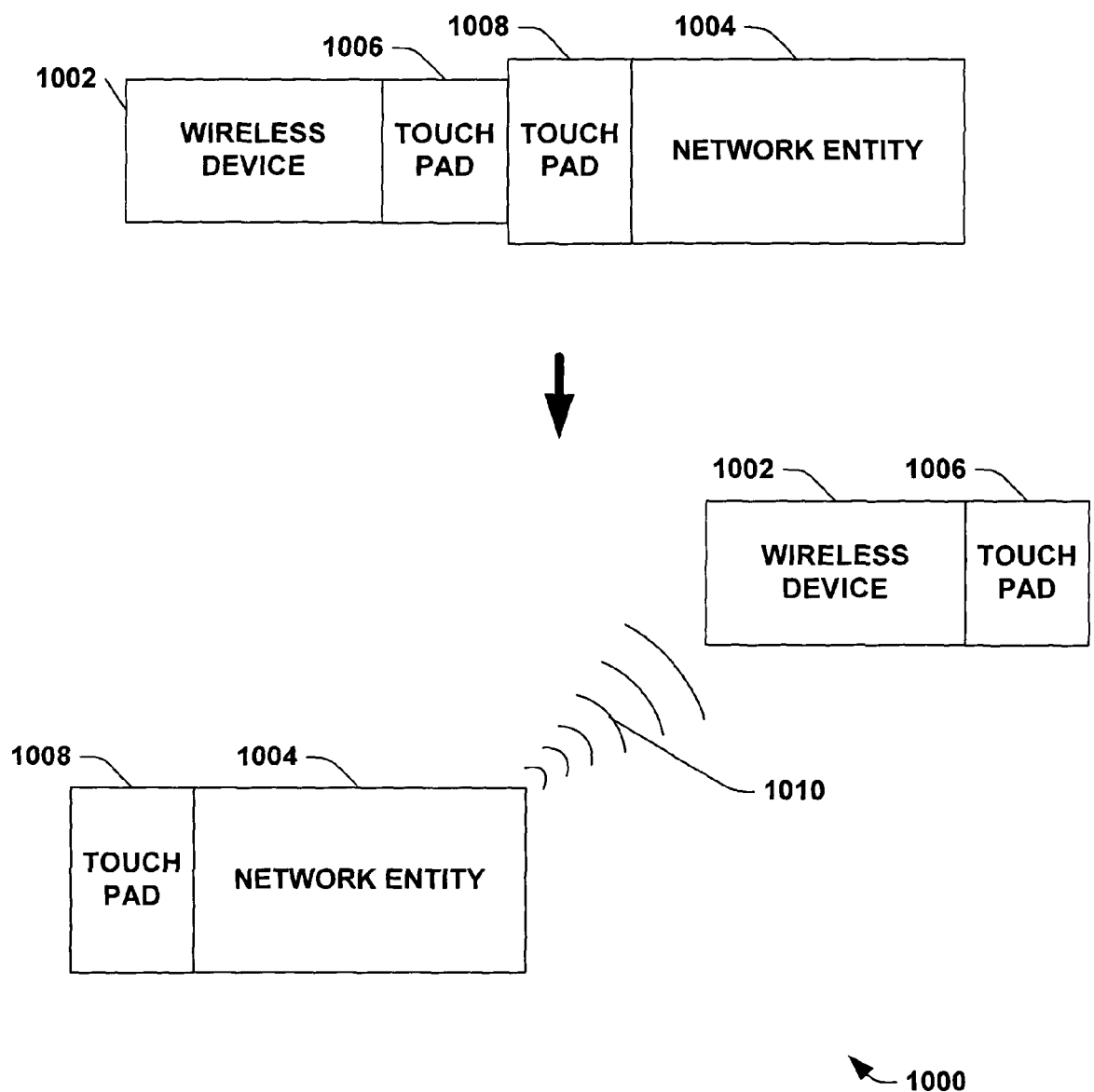
FIG. 10 is a block diagram of physical device bonding system utilizing a touch-pad in accordance with an aspect of the present invention.

FIG. 10 illustrates a physical device bonding system 1000 in which the installation and/or authentication of a wireless device 1002 is facilitated utilizing a touch pad 1006 on the wireless device 1002 and a touch pad 1008 on a network entity 1004 as the physical interface component. The system 1000 can exchange at least the installation protocols and/or authentication protocols during the physical connection between the touch pads 1006, 1008 in order to establish a non-physical connection 1010. It is to be appreciated that the installation and/or authentication protocols can be utilized during the physical connection or reserved for a later time. The touch pads 1006 and 1008 can further comprise an invocation component (not shown). The invocation component (not shown) can invoke the installation and/or authentication of a device during and/or after the physical connection provided by the touch pads 1006 and 1008. It is to be appreciated that the invocation component can be incorporated into the touch pad for the wireless device 1002 or within the network entity 1004. In other words, the invocation component can be incorporated into either the wireless device 1002 or within the network entity 1004 such that upon the physical connection between the touch pads 1006, 1008, the invocation component (not shown) can invoke the installation and/or authentication of the wireless device.

The touch pads 1006 and 1008 facilitate the complications involved with installing and/or authenticating the wireless device 1002 to the network entity 1004 by employing the physically touching (e.g., wireless device 1002 and the network entity 1004) as the physical connection. The touch pads 1006, 1008 can be conductive materials such as, but not limited to, copper, gold, silver, conductive plastics, metal, . . . . It is to be appreciated any material can be used for the composition of the touch pads 1006, 1008 so long as the physical connection can exchange the necessary installation and/or authentication information between the wireless device 1002 and the network entity 1004 for the non-physical connection 1010.

Figure 11:
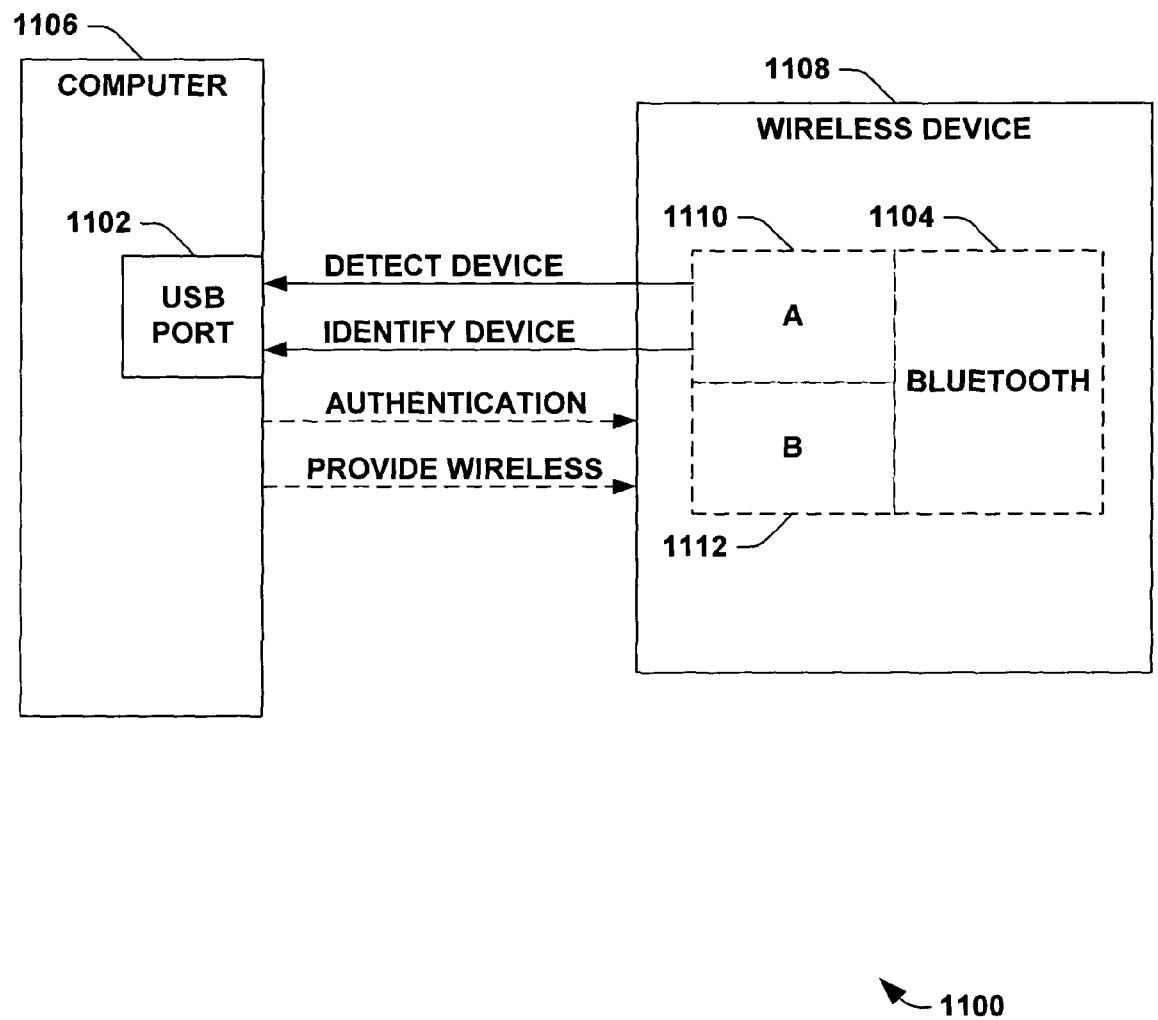
FIG. 11 is a block diagram of a conventional USB port utilizing Bluetooth technology.

Now turning to FIG. 11, a conventional universal serial bus (USB) port 1102 utilizing Bluetooth technology 1104 for a non-physical connection is illustrated so as to differentiate the present invention. A computer 1106 can utilize a USB port 1102 in order to provide a connection to a wireless device 1108 containing A 1110 for up streaming information to the computer 1106 and B 1112 for down streaming information from the computer 1106. The bidirectional data is sent over the same connector, yet the information is just serialized. Upon connection of the USB port 1102 to the wireless device 1108 utilizing A 1110, the wireless device 1108 can be detected. Once detected, the identity of the wireless device 1108 is known and the software can be installed onto the computer. The conventional USB port 1102 and A 1110 are only used for identity and detection of the wireless device 1108. After the conventional USB port 1102 connection is disengaged (e.g., no physical connection is present), the wireless connection is installed utilizing Bluetooth technology 1104 with the computer 1106 in which the wireless device 1108 is detected. Once the computer 1106 detects the wireless device 1108, the wireless connection can be established upon authentication. In other words, the conventional USB port 1102 does not utilize the physical connection to invoke the installation and/or authentication of a non-physical connection utilizing the installation and/or authentication protocols.

As discussed above, the complications regarding the prior art installation and/or authentication can be extremely problematic. For example, the network entity does not know when to look for wireless devices to install. Additionally, when the network entity does find a plurality of wireless devices to install, it is unaware of the devices to install. Also, a wireless device must be within range of a network entity in order for the wireless device to be found. Furthermore, authentication and security is difficult over a wireless connection. However, by utilizing the present invention, the complications involved with the installation and/or authentication of a wireless device to a network entity to establish a non-physical connection can be solved by utilizing a physical connection for the exchange of installation and/or authentication protocols.

Figure 12:
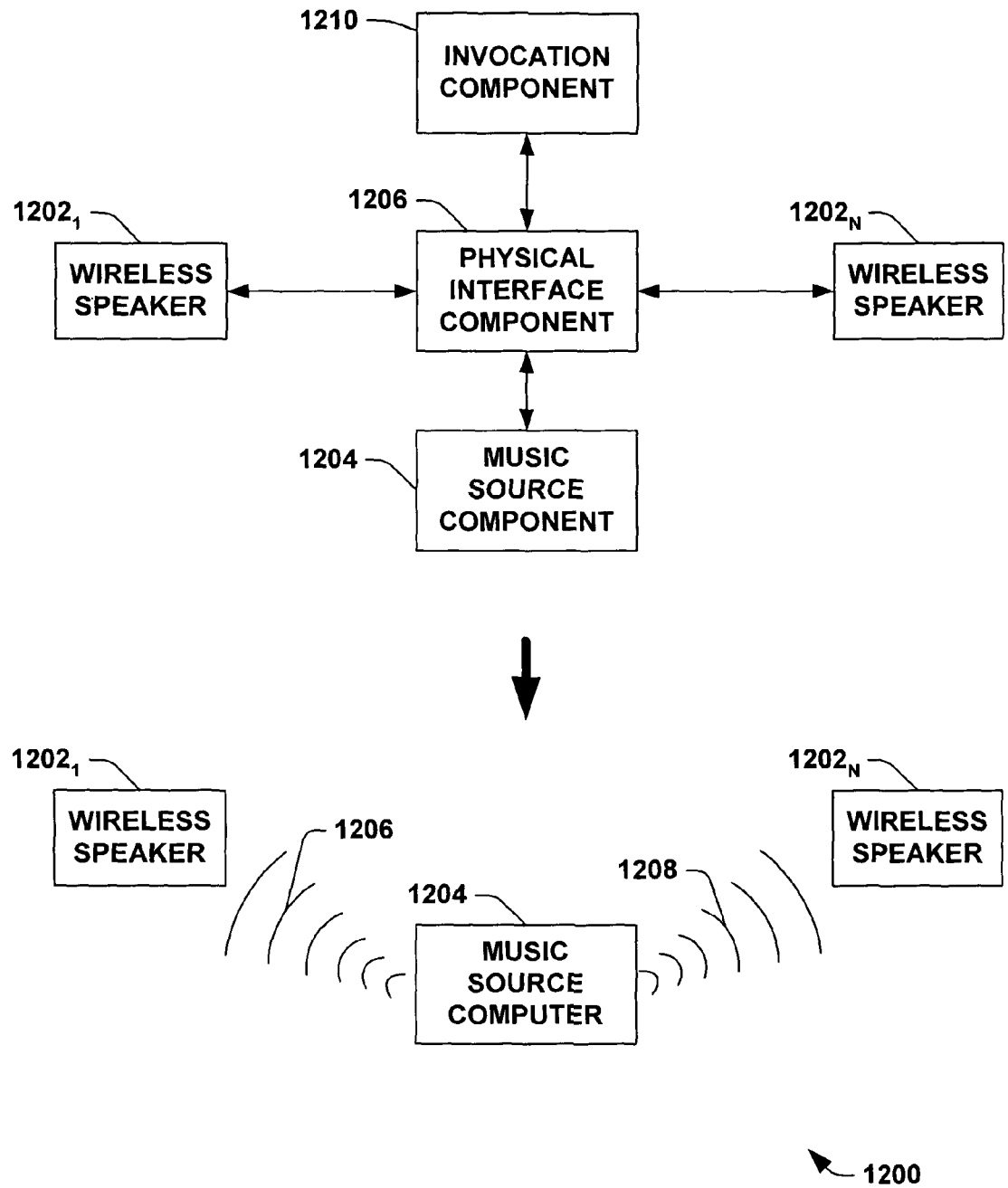
FIG. 12 is a block diagram of a physical device bonding in accordance with the present invention.

Referring to FIG. 12, a physical bonding system 1200 illustrates the installation and/or authentication of a wireless speaker $1202_1$ to a music source component 1204 by a physical interface component 1206 providing a physical connection and an invocation component 1210 which employs the necessary installation and/or authentication protocols for a non-physical connection 1206. It is to be appreciated the music source component can be, for example, a stereo receiver, an MP3 player, compact disc (CD) player, digital versatile disk (DVD) player, personal computer, laptop, record player, tape player, . . . . Furthermore, it is also to be appreciated the number of wireless speakers (collectively referred to as the wireless speakers 1202) can be $1202_1$ to $1202_N$, where N is an integer. By utilizing a physical interface component 1206 to provide a physical connection between the wireless speakers 1202 and the music source component 1204, the invocation component 1210 can invoke the installation and/or authentication in which the installation and/or authentication protocols can be exchanged securely without the possibility of "sniffing." After the necessary protocols are provided via the physical interface component 1206 and the invocation component 1210 (e.g., the protocols can be provided during the connection or reserved for a later time), a non-physical connection 1206 and 1208 can be established for the wireless speakers 1202₁ and 1202ₙ respectively.

Figure 13:
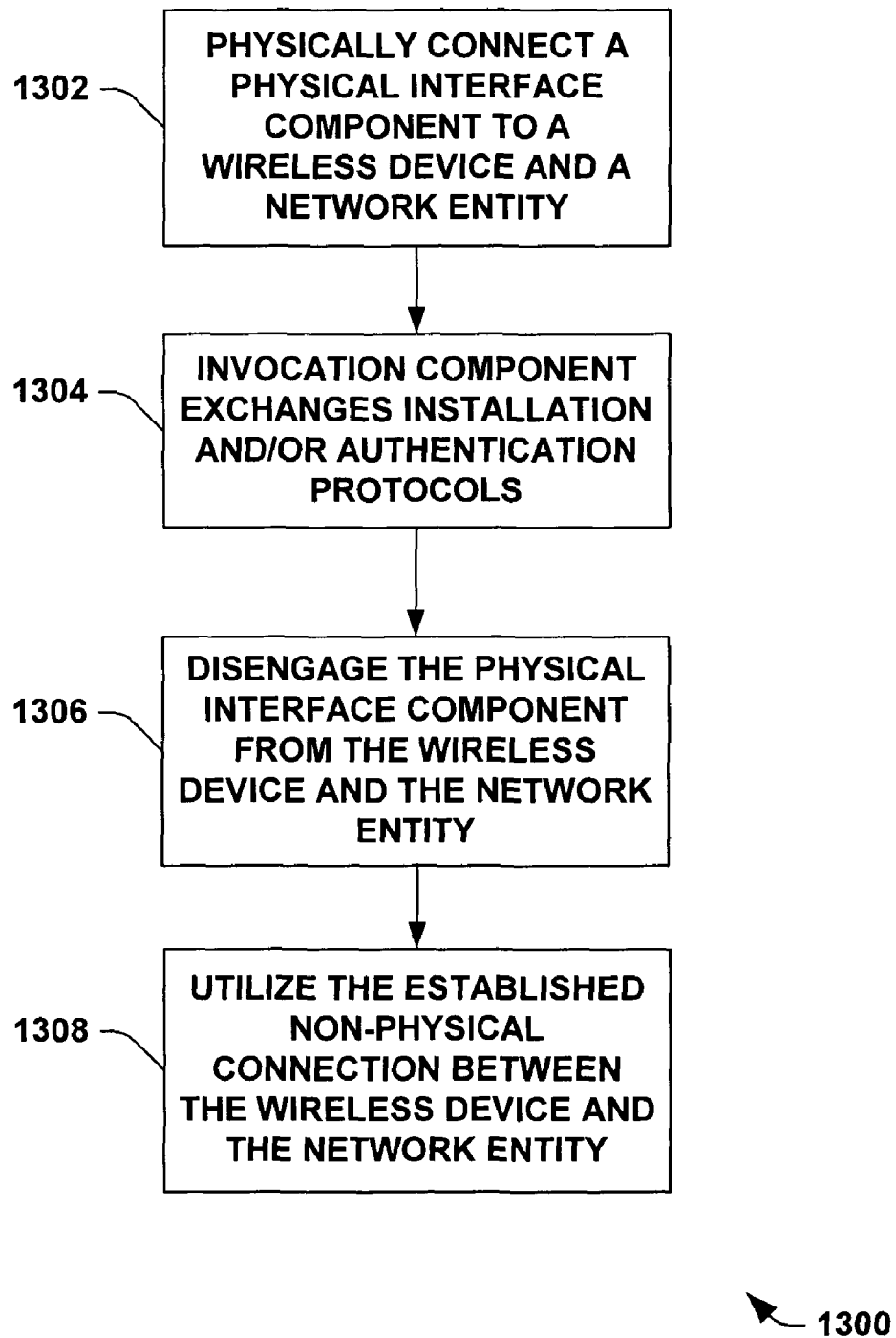
FIG. 13 is a flow chart illustrating a methodology for physical device bonding in accordance with an aspect of the present invention.
Figure 14:
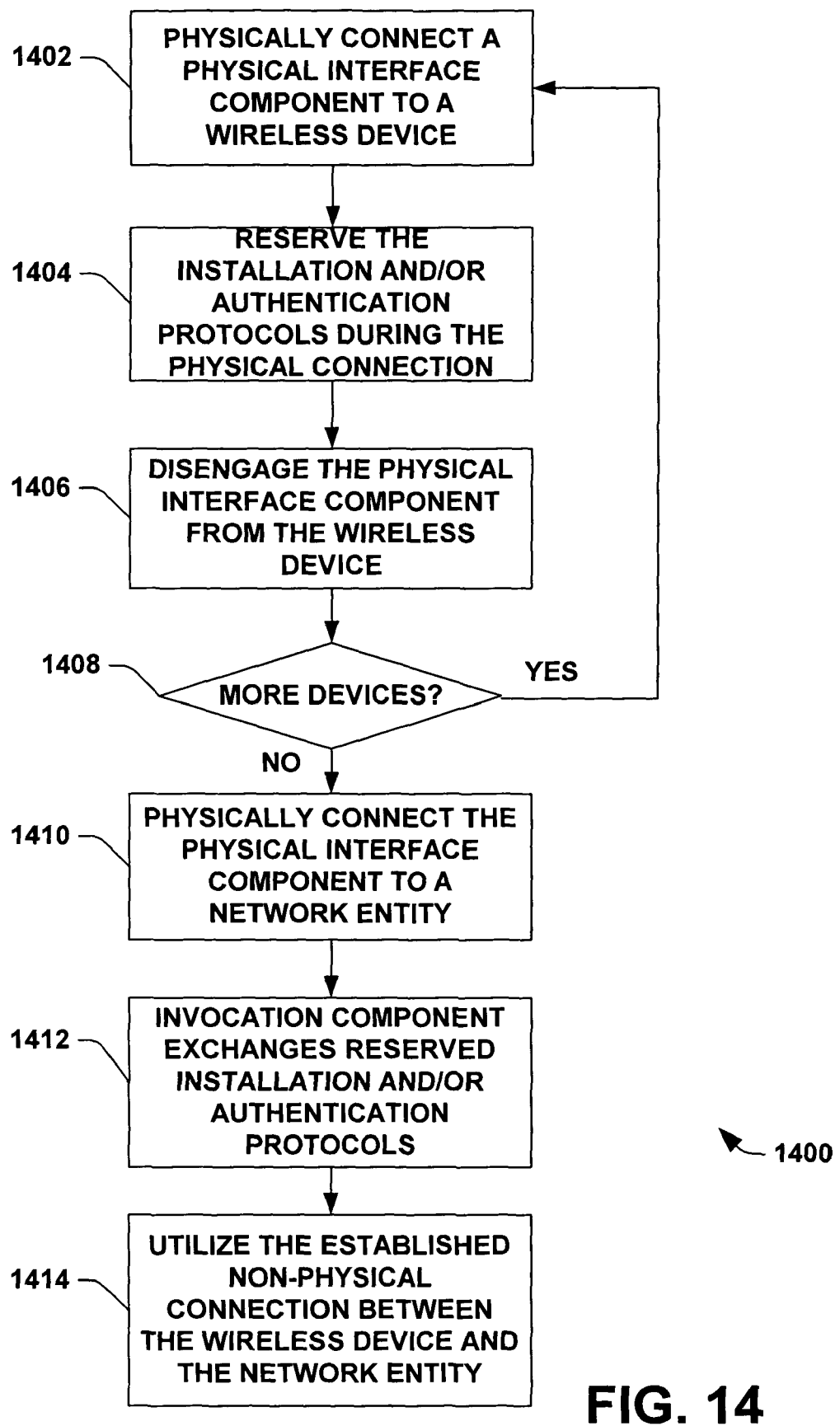
FIG. 14 is a flow chart illustrating a methodology for physical device bonding in accordance with an aspect of the present invention.
Figure 15:
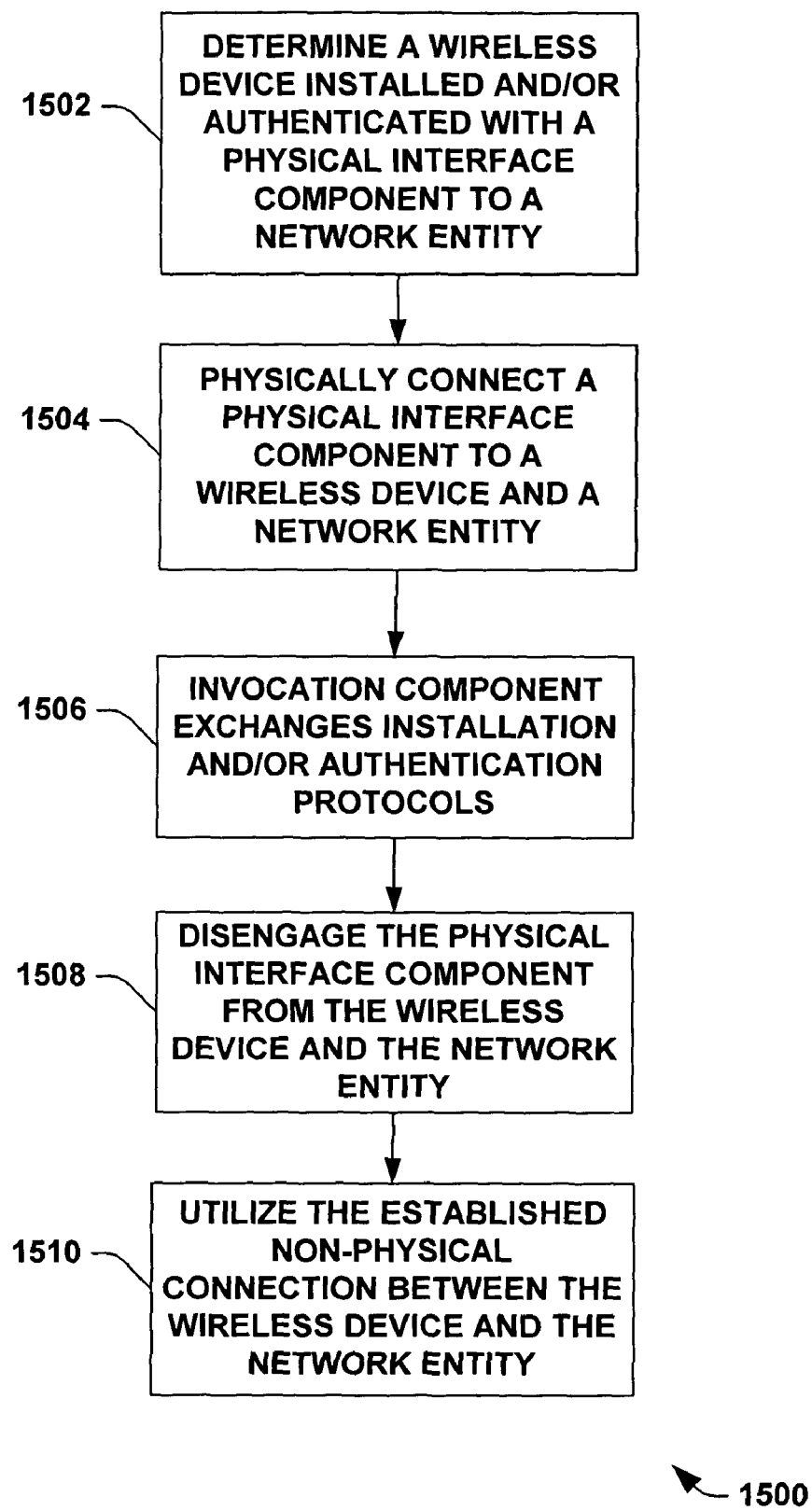
FIG. 15 is a flow chart illustrating a methodology for physical device bonding in accordance with an aspect of the present invention.

FIGS. 13, 14 and 15 illustrate various methodologies in accordance with the subject invention. While, for purposes of simplicity of explanation, the methodologies are shown and described as a series of acts, it is to be understood and appreciated that the present invention is not limited by the order of acts, as some acts may, in accordance with the present invention, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the present invention.

Referring to FIG. 13, a methodology 1300 provides the establishment of a non-physical connection between a wireless device and a network entity via a physical interface component. At 1302, a user can physically connect a physical interface component to a wireless device and a network entity. For example, the physical interface component can be connected to the wireless device and the network entity by, but not limited to, a cord, cradle, human, touch-pad, dock, wand, wire, conductive materials, . . . . After the wireless device and the network entity are physically connected, the invocation component employs at least an installation and/or authentication protocol at 1304. The installation and/or authentication protocols can invoke the installation and/or authentication of the wireless device to a network entity to establish a non-physical connection. Moreover, the installation and/or authentication protocols can be utilized during the physical connection or reserved for a later time. Next at 1306, the user can disengage the component from the wireless device and the network entity. In other words, the user can disconnect the physical connection upon the completion of the information exchange of installation and/or authentication protocols between the wireless device and the network entity. At 1308, the non-physical connection between the wireless device and the network entity is established and can be used.

Turning to FIG. 14, a methodology 1400 demonstrates the physical interface component employing a token key technique in order to install and/or authenticate a plurality of wireless devices to a network in which a non-physical connection is established. At 1402, a physical interface component is physically connected to a wireless device. The physical interface component can be, for example, a wire, cradle, USB cable, conductive materials, . . . . At 1404, the installation and/or authentication protocols are exchanged during the physical connection or can be reserved for later use. In other words, the installation and/or authentication information can be utilized when the physical interface component has been physically connected to the wireless device and the network entity to establish both sides of communication (e.g., wireless device side and network side). After the information exchange between the wireless device and the physical interface component is complete, the user can disengage the physical connection between the wireless device and the physical interface component. At 1408, the physical interface component can either be used for the installation and/or authentication of more wireless devices or complete the installation and/or authentication for the previously physically connected wireless device(s). If the latter, the physical interface component is physically connected to the network entity at 1410. At which point the reserved installation and/or authentication protocols are utilized by the invocation component at 1412. The invocation component can install and/or authenticate all of the previously physically connected wireless devices to the physical interface component by utilizing the reserved exchanged information (e.g., installation and/or authentication protocols). After the necessary information is exchanged to the network entity, the user can disengage the physical connection between the physical interface component and the network entity. At 1414, the non-physical connection between at least one wireless device and a network entity is established and can be utilized.

Now referring to FIG. 15, a methodology 1500 illustrates the use of a daisy chain scheme providing the installation and/or authentication of a wireless device to a network entity for establishing a non-physical connection. At 1502, the user can determine an installed and/or authenticated connection between a wireless device and a network entity which had been installed and/or authenticated by the present invention (e.g., the connection can be considered secure based at least upon the advantages of a physical connection stated above). Once a secure connection has been determined, the physical interface component can be physically connected to the wireless device that is associated with the secure connection at 1504. After the physical connection between the wireless device and the wireless device associated with the secure connection, the invocation component can invoke the exchange of the installation and/or authentication protocols at 1506. The installation and/or authentication protocols can be utilized during the physical connection or they can be reserved for a later time. In one aspect in accordance with the present invention, the installation and/or authentication protocols can be exchanged from the wireless device through the physical interface component, to the wireless device associated with the secure connection, and from the secured wireless device connection to the network entity. At 1508, the user can disengage the physical connection between the wireless device and the wireless device associated with a secure connection. After the physical connection is disengaged, the non-physical connection is established between the network entity and the wireless device and can be utilized at 1510.

Figure 16:
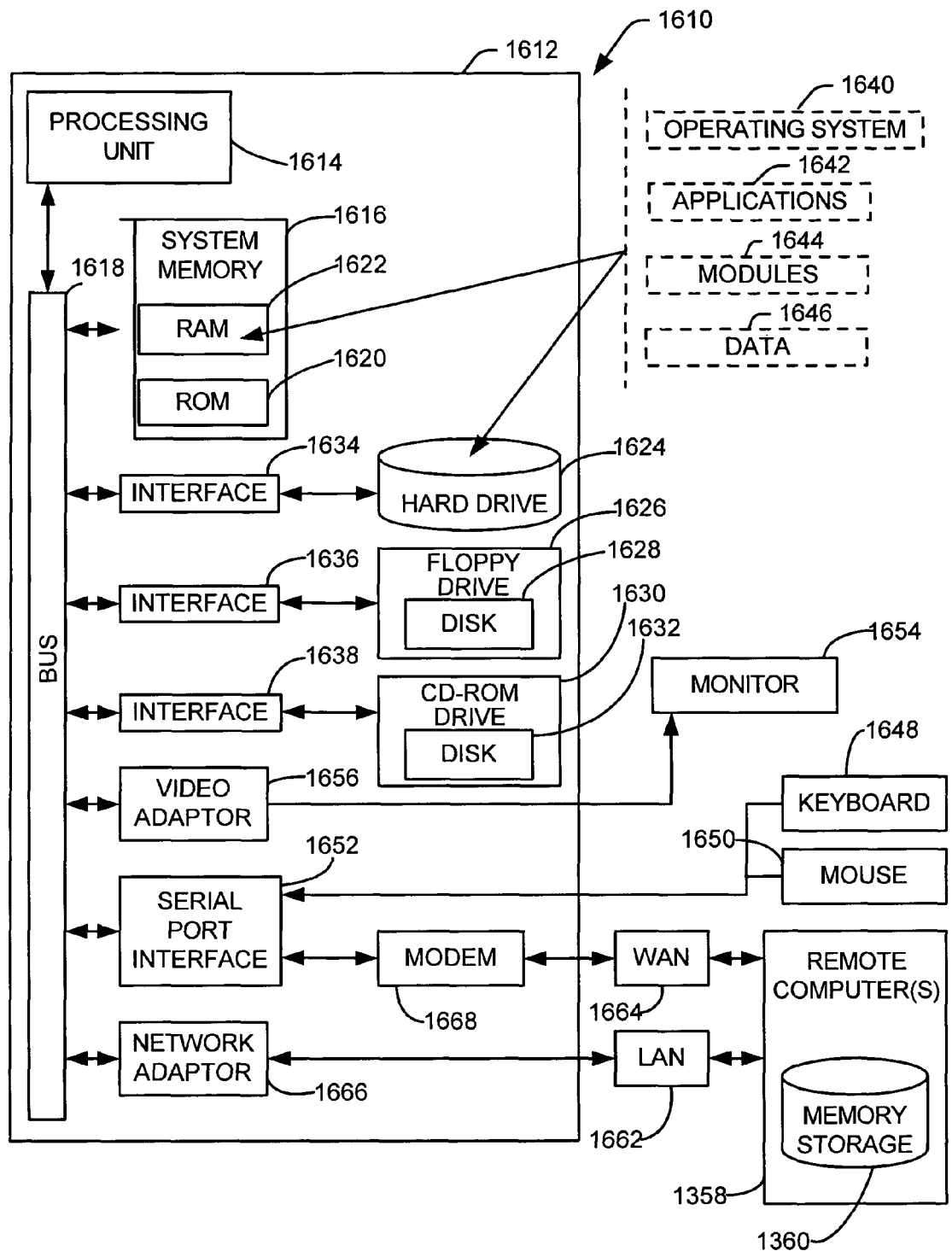
FIG. 16 is a schematic block diagram of an exemplary operating environment for a system configured in accordance with the present invention.

In order to provide additional context for various aspects of the present invention, FIG. 16 and the following discussion are intended to provide a brief, general description of one possible suitable computing environment 1610 in which the various aspects of the present invention may be implemented. It is to be appreciated that the computing environment 1610 is but one possible computing environment and is not intended to limit the computing environments with which the present invention can be employed. While the invention has been described above in the general context of computer-executable instructions that may run on one or more computers, it is to be recognized that the invention also may be implemented in combination with other program modules and/or as a combination of hardware and software. Generally, program modules include routines, programs, components, data structures, etc. that perform particular tasks or implement particular abstract data types. Moreover, one will appreciate that the inventive methods may be practiced with other computer system configurations, including single-processor or multi-processor computer systems, minicomputers, mainframe computers, as well as personal computers, hand-held computing devices, microprocessor-based or programmable consumer electronics, and the like, each of which may be operatively coupled to one or more associated devices. The illustrated aspects of the invention may also be practiced in distributed computing environments where certain tasks are performed by remote processing devices that are linked through a communications network. In a distributed computing environment, program modules may be located in both local and remote memory storage devices.

FIG. 16 illustrates one possible hardware configuration to support the systems and methods described herein. It is to be appreciated that although a standalone architecture is illustrated, that any suitable computing environment can be employed in accordance with the present invention. For example, computing architectures including, but not limited to, stand alone, multiprocessor, distributed, client/server, minicomputer, mainframe, supercomputer, digital and analog can be employed in accordance with the present invention.

With reference to FIG. 16, an exemplary environment 1610 for implementing various aspects of the invention includes a computer 1612, including a processing unit 1614, a system memory 1616, and a system bus 1618 that couples various system components including the system memory to the processing unit 1614. The processing unit 1614 may be any of various commercially available processors. Dual microprocessors and other multi-processor architectures also can be used as the processing unit 1614.

The system bus 1618 may be any of several types of bus structure including a memory bus or memory controller, a peripheral bus, and a local bus using any of a variety of commercially available bus architectures. The computer memory 1616 includes read only memory (ROM) 1620 and random access memory (RAM) 1622. A basic input/output system (BIOS), containing the basic routines that help to transfer information between elements within the computer 1612, such as during start-up, is stored in ROM 1620.

The computer 1612 may further include a hard disk drive 1624, a magnetic disk drive 1626, e.g., to read from or write to a removable disk 1628, and an optical disk drive 1630, e.g., for reading a CD-ROM disk 1632 or to read from or write to other optical media. The hard disk drive 1624, magnetic disk drive 1626, and optical disk drive 1630 are connected to the system bus 1618 by a hard disk drive interface 1634, a magnetic disk drive interface 1636, and an optical drive interface 1638, respectively. The computer 1612 typically includes at least some form of computer readable media. Computer readable media can be any available media that can be accessed by the computer 1612. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other magnetic storage devices, or any other medium which can be used to store the desired information and which can be accessed by the computer 1612. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

A number of program modules may be stored in the drives and RAM 1622, including an operating system 1640, one or more application programs 1642, other program modules 1644, and program non-interrupt data 1646. The operating system 1640 in the computer 1612 can be any of a number of commercially available operating systems.

A user may enter commands and information into the computer 1612 through a keyboard 1648 and a pointing device, such as a mouse 1650. Other input devices (not shown) may include a microphone, an IR remote control, a joystick, a game pad, a satellite dish, a scanner, or the like. These and other input devices are often connected to the processing unit 1614 through a serial port interface 1652 that is coupled to the system bus 1618, but may be connected by other interfaces, such as a parallel port, a game port, a universal serial bus ("USB"), an IR interface, etc. A monitor 1654, or other type of display device, is also connected to the system bus 1618 via an interface, such as a video adapter 1656. In addition to the monitor, a computer typically includes other peripheral output devices (not shown), such as speakers, printers etc.

The computer 1612 may operate in a networked environment using logical and/or physical connections to one or more remote computers, such as a remote computer(s) 1658. The remote computer(s) 1658 may be a workstation, a server computer, a router, a personal computer, microprocessor based entertainment appliance, a peer device or other common network node, and typically includes many or all of the elements described relative to the computer 1612, although, for purposes of brevity, only a memory storage device 1660 is illustrated. The logical connections depicted include a local area network (LAN) 1662 and a wide area network (WAN) 1664. Such networking environments are commonplace in offices, enterprise-wide computer networks, intranets and the Internet.

When used in a LAN networking environment, the computer 1612 is connected to the local network 1662 through a network interface or adapter 1666. When used in a WAN networking environment, the computer 1612 typically includes a modem 1668, or is connected to a communications server on the LAN, or has other means for establishing communications over the WAN 1664, such as the Internet. The modem 1668, which may be internal or external, is connected to the system bus 1618 via the serial port interface 1652. In a networked environment, program modules depicted relative to the computer 1612, or portions thereof, may be stored in the remote memory storage device 1660. It will be appreciated that the network connections shown are exemplary and other means of establishing a communications link between the computers may be used.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A physical device bonding system that facilitates at least one of device installation or authentication, comprising:
    a physical interface component comprising hardware that physically couples at least a first device and a second device, wherein the physical interface component:
    receives connection information associated with at least one of an installation protocol or an authentication protocol from the first device;
    stores the connection information in a memory of the physical interface component;
    provides the connection information to the second device to establish a non-physical connection between the first device and the second device; and
    generates a prompt to the second device to invoke at least one of an installation or an authentication of the first device, wherein the generated prompt directs the second device to perform at least one of the installation or the authentication.

2. The system of claim 1, wherein the first device is a wireless device and the second device is a network entity.

3. The system of claim 1, wherein the generated prompt directs the second device to perform at least one of the installation or the authentication during the physical coupling.

4. The system of claim 1, wherein the generated prompt directs the second device to perform at least one of the installation or the authentication after the physical coupling is disengaged.

5. The system of claim 1, wherein the physical interface component utilizes a daisy chain scheme to establish a non-physical connection between at least a third device and the second device.

6. The system of claim 1, wherein the physical interface component is at least one of the following: a cradle; a dock; or a wand.

7. The system of claim 1, wherein the physical interface component comprises a touch-pad comprising a conductive material.

8. The system of claim 1, wherein the non-physical connection is at least one of: a wireless connection; an optical connection; or an infrared connection.

9. The system of claim 1, wherein the physical interface component stores connection information for a plurality of first devices to establish a plurality of non-physical connections.

10. The system of claim 9, wherein the non-physical connections are independent and separate.

11. A physical device bonding system, comprising:
    a physical interface component comprising hardware that provides a physical connection between at least a device and a network entity, wherein the physical interface component:
    receives connection information associated with at least one of an installation protocol or an authentication protocol from the device;
    stores the connection information in a memory of the physical interface component; and
    generates a prompt to the network entity to invoke performance by the network entity of at least one of a device installation or a device authentication to establish a non-physical connection with the device using the connection information, wherein the generated prompt directs the network entity to perform at least one of the device installation or the device authentication.

12. The system of claim 11, further comprising an artificial intelligence component that utilizes a user profile to infer the connection information.

13. The system of claim 11, wherein the device is at least one of a wireless adapter; a wireless speaker; a wireless headset; a wireless keyboard; a wireless mouse; a wireless monitor; a wireless personal digital assistant (PDA); a wireless access point; or a wireless MP3 player.

14. The system of claim 11, wherein the network entity is at least one of a personal computer, a laptop computer, a music source, a router, or a host to a wireless device.

15. The system of claim 11, wherein the network entity is a host to a wireless device.

16. A physical device bonding system that facilitates at least one of device installation or authentication, comprising an invocation component operatively connected to physical interface hardware that physically connects a wireless device and a network entity, wherein the invocation component is configured to:
    receive from the wireless device data identifying at least one of an installation protocol or an authentication protocol for establishing a wireless connection between the wireless device and the network entity;
    provide the data to the network entity; and
    generate a prompt to the network entity to invoke establishment by the network entity of the wireless connection between the wireless device and the network entity using the at least one of the installation protocol or the authentication protocol, wherein the generated prompt directs the network entity to perform the establishment of the wireless connection.

17. The system of claim 16, wherein the invocation component is further configured to utilize a daisy chain scheme to establish a second wireless connection between a second wireless device and the network entity.

18. A physical device bonding method that facilitates wireless communication, the method comprising:
    while a physical interface component comprising hardware is physically connected to a wireless device, storing connection information associated with at least one of an installation protocol or an authentication protocol from the wireless device within a memory of the physical interface component; and
    while the physical interface component is physically disconnected from the wireless device and physically connected to a network entity, providing the connection information to the network entity from the memory of the physical interface component, and generating a prompt from the physical interface component to the network entity to invoke establishment by the network entity of a wireless connection between the wireless device and the network entity so that the wireless device and the network entity communicate wirelessly, wherein the generated prompt directs the network entity to perform the establishment of the wireless connection.

19. The method of claim 18, wherein the generated prompt directs the network entity to establish the wireless connection while the network entity is physically connected to the physical interface component.

20. The method of claim 18, wherein the generated prompt directs the network entity to establish the wireless connection after the network entity is physically disconnected from the physical interface component.

21. The method of claim 18, further comprising utilizing an artificial intelligence technique to infer the connection information.

22. The method of claim 18, further comprising utilizing a daisy chain scheme to establish a second wireless connection between a second wireless device and the network entity.

23. A system comprising a computer readable storage medium and a physical interface component comprising hardware, the computer readable storage medium having stored thereon computer executable instructions for facilitating at least one of device installation or authentication through performing steps of:
- receiving first connection information associated with at least one of a first installation protocol or a first authentication protocol while the physical interface component is physically connected to a first wireless device;
- receiving second connection information associated with at least one of a second installation protocol or a second authentication protocol while the physical interface component is physically connected to a second wireless device;
- storing the first and second connection information in a memory of the physical interface component;
- providing the first and second connection information to a network entity while the physical interface component is physically connected to the network entity: and
- generating a prompt from the physical interface component to the network entity to invoke establishment by the network entity of non-physical connections between the first and second wireless devices and the network entity so that the first and second wireless devices and the network entity communicate wirelessly, wherein the generated prompt directs the network entity to perform the establishment of the wireless connection.

24. A physical device bonding system that facilitates wireless communication comprising:
- means for physically coupling at least two devices through a physical interface; means for storing, in a memory of the physical interface, data identifying at least one of an installation protocol or an authentication protocol for establishing a wireless connection between the at least two devices;
- means for providing the data from the memory of the physical interface to at least one network entity; and
- means for generating a prompt from the physical interface to the at least one network entity to invoke establishment by the at least one network entity of the wireless connection using the at least one of the installation protocol or the authentication protocol, wherein the generated prompt directs the network entity to perform the establishment of the wireless connection.

* * * * *